United States Patent
Harshith

(10) Patent No.: US 11,997,156 B2
(45) Date of Patent: May 28, 2024

(54) SCAN FUNCTIONALITY FOR VIRTUAL SESSIONS

(71) Applicant: Citrix Systems, Inc., Fort Lauderdale, FL (US)

(72) Inventor: Katta Rajasekhar Sreenivas Harshith, Andhra Pradesh (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/861,313

(22) Filed: Jul. 11, 2022

(65) Prior Publication Data
US 2024/0015205 A1    Jan. 11, 2024

(51) Int. Cl.
*H04L 12/00* (2006.01)
*G06F 16/11* (2019.01)
*G06F 21/36* (2013.01)
*H04L 67/06* (2022.01)

(52) U.S. Cl.
CPC ............ *H04L 67/06* (2013.01); *G06F 16/116* (2019.01); *G06F 21/36* (2013.01)

(58) Field of Classification Search
CPC ......... H04L 67/06; G06F 16/116; G06F 21/36
USPC ........................................ 709/201–203, 219
See application file for complete search history.

(56) References Cited

U.S. PATENT DOCUMENTS

| | | | | |
|---|---|---|---|---|
| 6,965,460 B1* | 11/2005 | Gann | ..................... | H04N 1/193 358/453 |
| 9,270,857 B2* | 2/2016 | Edgar | ..................... | H04N 1/393 |
| 9,412,015 B2* | 8/2016 | Ishida | ................ | H04N 1/00251 |
| 2002/0186425 A1* | 12/2002 | Dufaux | ..................... | G06T 7/30 358/497 |
| 2006/0273171 A1* | 12/2006 | Shyu | ........................ | H03D 1/10 235/492 |
| 2011/0072514 A1* | 3/2011 | Gilder | .................. | G09G 3/3208 726/22 |

* cited by examiner

*Primary Examiner* — Frantz Coby

(57) ABSTRACT

Methods, systems, and computer readable media for deploying an implementing scan functionality for virtual sessions are described herein. A user device may include a user device display and may be configured to access a virtual session. The user device may further be configured to present an identity code that includes identity information that is associated with a scan session and virtual session. A mobile device may include a camera, and may be configured to detect a user selection of a scan option within a client agent. The mobile device may further be configured to capture the identity code presented by the user device. The mobile device may capture with the camera one or more images as scan items. The mobile device may send, to a server associated with the virtual session, the scan items, and the identity information. The server may place the scan items in the virtual session.

20 Claims, 16 Drawing Sheets

SCAN FUNCTIONALITY FOR VIRTUAL SESSIONS

FIELD

Aspects described herein generally relate to computer networking, remote computer access, virtualization, enterprise mobility management, and hardware and software related thereto. More specifically, one or more aspects describe herein provide systems, mechanisms, apparatuses, and methods for quickly and efficiently scanning documents to a virtual session that is accessed by a user device.

BACKGROUND

User devices and other devices commonly access virtual sessions (e.g., virtual desktops, virtual applications). In doing so, users are often required, or desire, to scan, for example, documents, to the virtualized session. This generally requires an additional standalone, dedicated (e.g., purpose-specific) scanner device. Additionally, often, not all scanner devices are compatible with virtual sessions. Further still, because such functionality often requires routing to the virtual session, it is often accompanied by high latency, and network disruptions can cause an ongoing scan to fail.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards methods systems and apparatuses for quickly and efficiently scanning documents to a virtual session running on a user device (e.g., personal computing device, mobile device etc.) using a mobile device camera.

In accordance with one or more aspects of the present disclosure, a method may include detecting, by a mobile device, a user selection of a scanning option within a client agent. The method may further include capturing, by the mobile device and from the user device accessing a virtual session, an identity code that may include identity information associated with the virtual session. Further, in response to capturing the identity code, the method may include displaying, by the mobile device, an add scan items option for adding one or more scan items to a scan. The method may further include detecting, by a mobile device, a user selection of the add scan items option and capturing by a camera of the mobile device, one or more images as scan items. The method may further include sending, to a server associated with the virtual session, the scan items and the identity information.

In accordance with one or more aspects of the present disclosure, the method may further include saving one or more of the scan items as a first file format, and converting, by the mobile device, one or more of the one or more scan items as a first file format, to a second file format.

In accordance with one or more aspects of the present disclosure, the method may further include saving one or more of the scan items as a first file format, and sending, to the server associated with the virtual session the one or more scan items as the first file format, the identity information, and instructions for converting one or more of the scan items to a second file format.

In accordance with one or more aspects of the present disclosure, the identity information may include at least a unique scan session identifier. The unique scan session identifier may be associated with at least a user device identifier and a virtual session identifier.

In accordance with one or more aspects of the present disclosure, the identity code may include a quick response (QR) code. Further, according to one or more aspects, the identity information may be embedded in the QR code.

In accordance with one or more aspects of the present disclosure, capturing of the identity code may include, capturing, by the camera of the mobile device, the QR code displayed on the user device.

In accordance with one or more aspects of the present disclosure, the method may further include obtaining, by the mobile device and from the identity code, the identity information.

In accordance with one or more aspects of the present disclosure, the method may further include, detecting, by the mobile device, a user selection of an add local file option. The method may further include attaching one or more local files to the scan as scan items, and sending, server associated with the virtual session, the scan items and the identity information.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
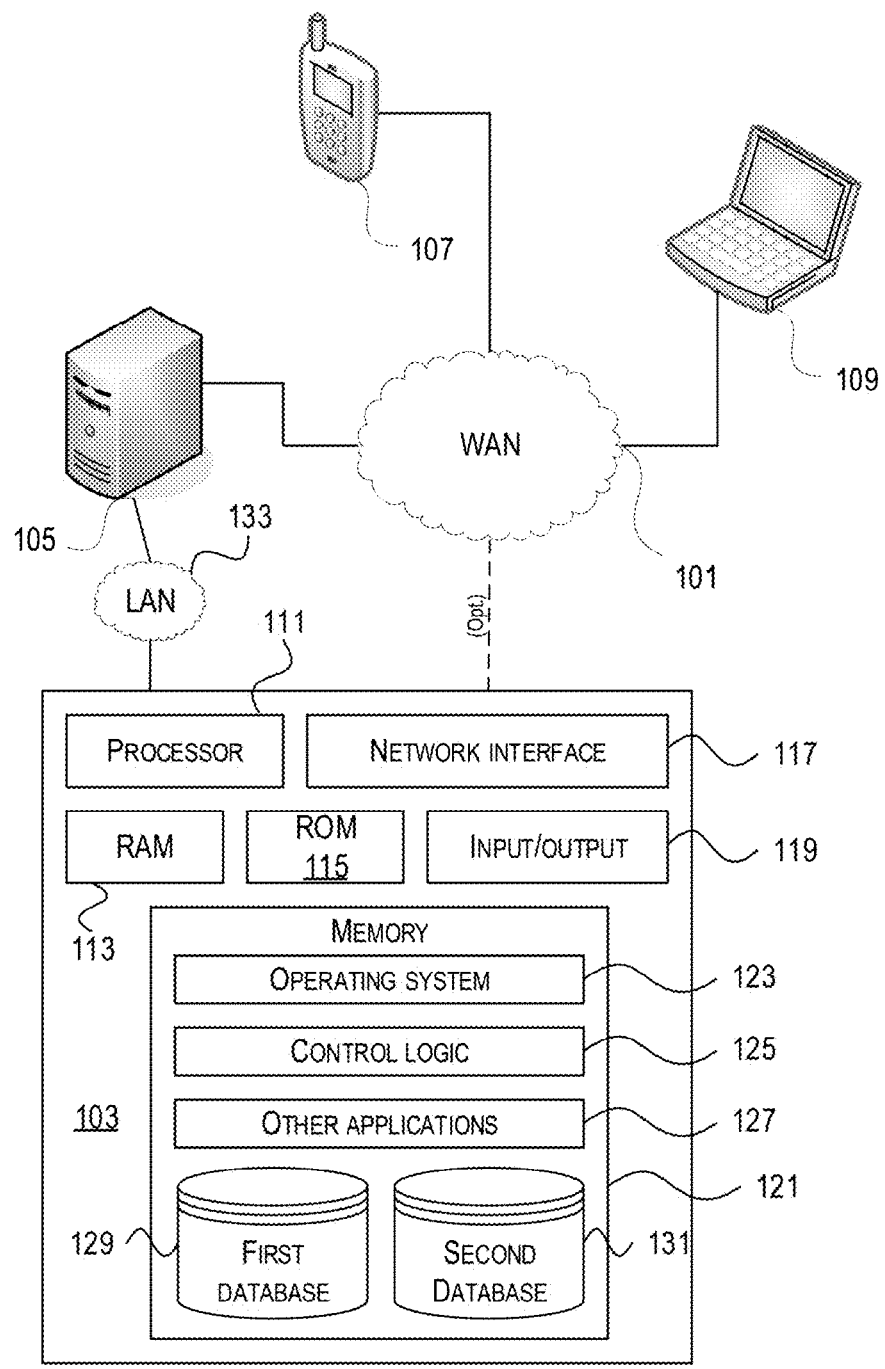
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods, systems, and apparatuses for quickly, easily, and efficiently scanning, for example documents, using a mobile device to a virtual session being accessed by a user device. For example, a user device may be accessing a virtual session. The virtual session may be hosted and supported by a server (e.g., a remote server). The virtual session may be configured to provide a scan option to initiate a scan session to add scan items (i.e., a scan) to the virtual session. Upon selection of the option, the user device may receive and/or generate identity information associated with the scan session. The user device may subsequently generate an identity code, including some of the identity information embedded therein, and present the identity code for capture. The user may subsequently navigate to a corresponding scan option within a virtual mobile workspace/client agent (e.g., virtual client agent) on a mobile device. The user may user the mobile device to capture the identity code being presented by the user device. The mobile device may obtain the identity information from the identity code. The mobile device may store the identity information and/or associate the identity information with the current scan session. The user may user a camera of the mobile device to capture scan item images to be added to the scan. The user may also add scan items variously. The mobile device may send, to the server, the scan items along with the identity information. The server may resolve the virtual session and the user device from which the scan session originated based on the identity information. The server may place the scan items (i.e., the scan) in the virtual session.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop or virtual desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
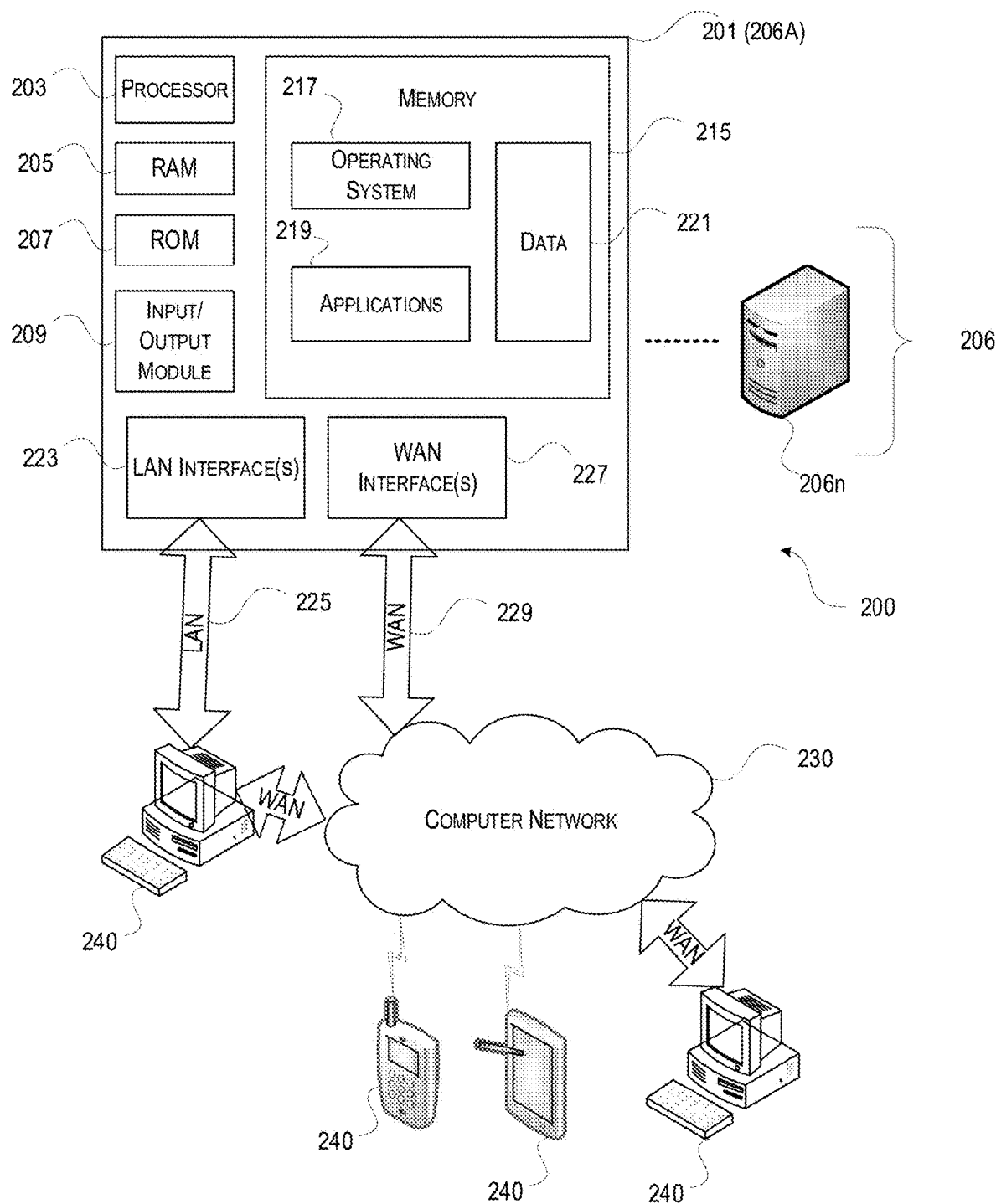
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
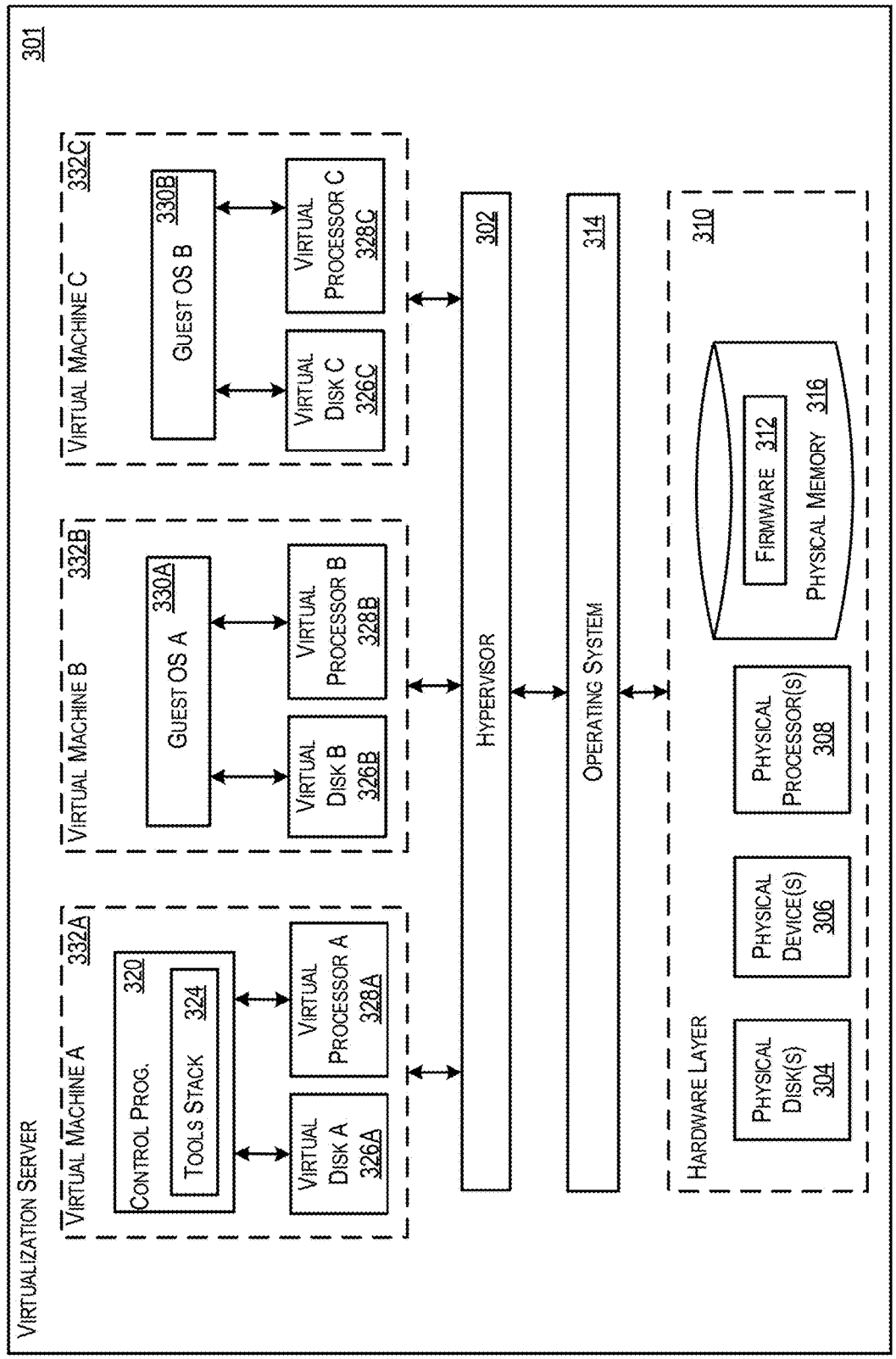
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual sessions, virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
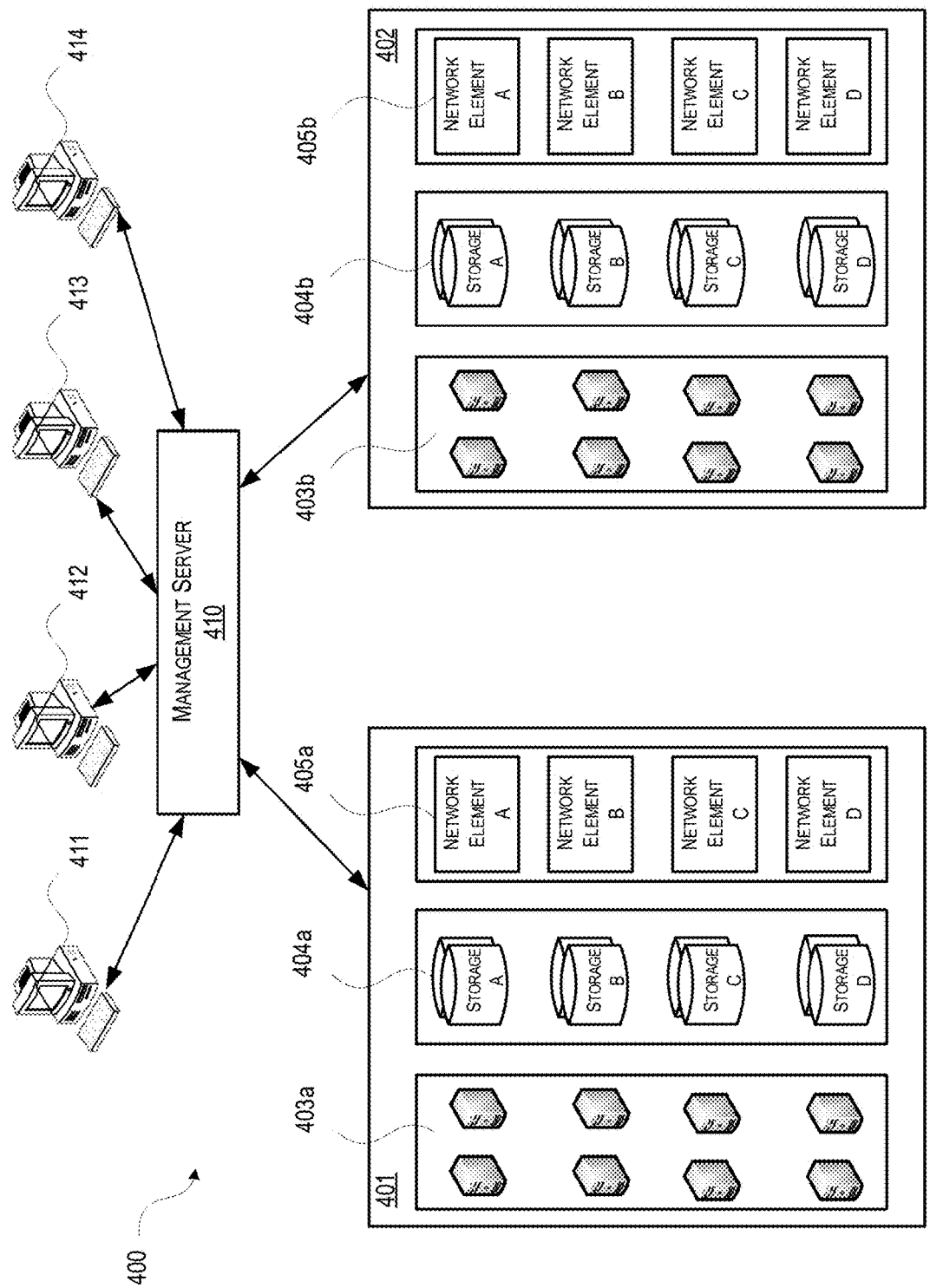
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Scan Functionality for Virtual Sessions

Figure 5:
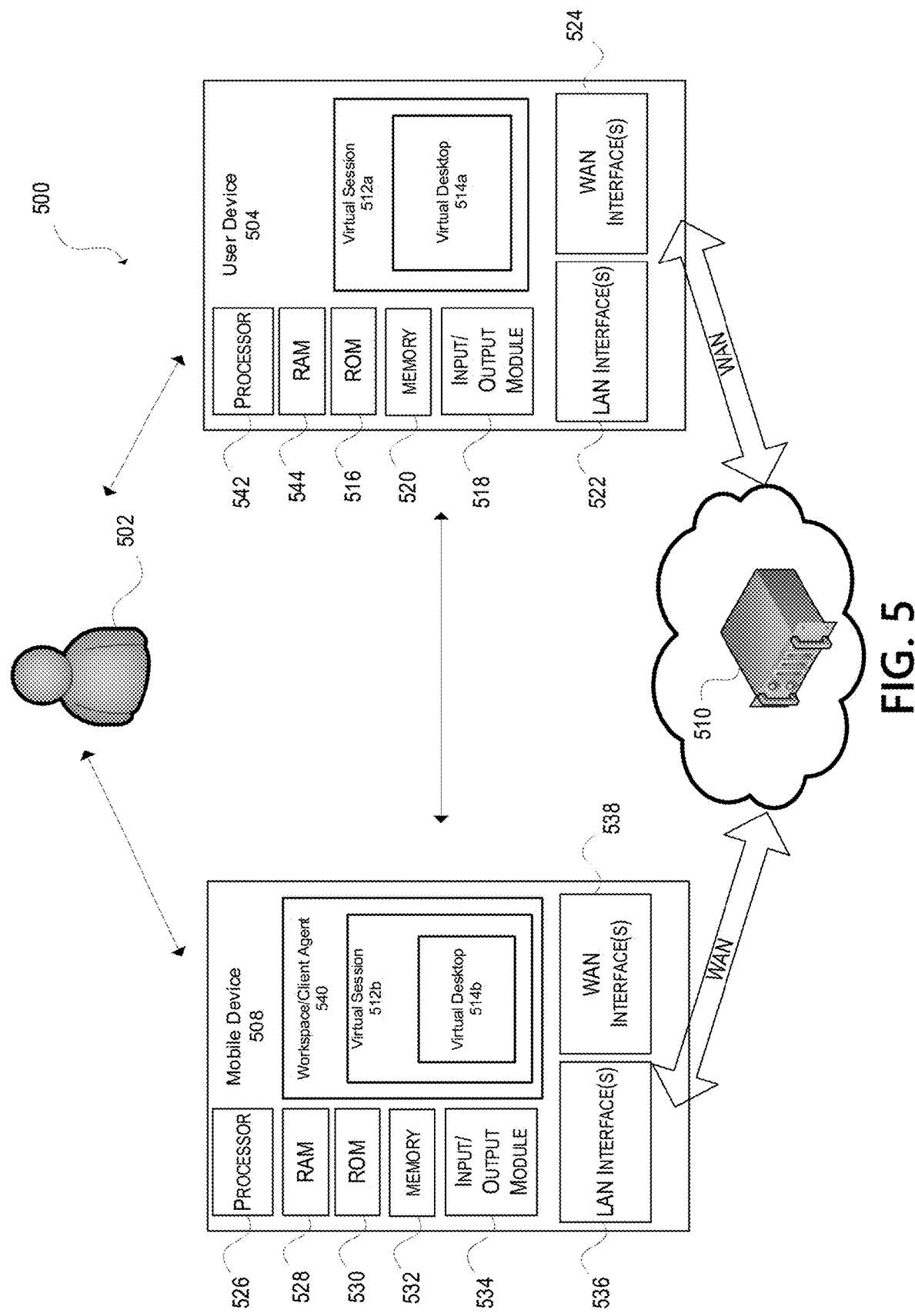
FIG. 5 depicts an illustrative environment for deploying and implementing scan functionalities for virtual sessions in accordance with one or more illustrative aspects described herein.

FIG. 5 depicts an illustrative environment for deploying and implementing scan functionalities for virtual sessions 512. Referring to FIG. 5, environment 500 may include a user 502, a user device 504, a mobile device 508, and a remote server 510. Environment 500 may include one or more additional components. Additionally, one or more depicted components of environment 500 may not be required. For example, aspects of the present disclosure may be practiced without user device 504 as will become clear from the present disclosure.

User 502 may have access to user device 504 and mobile device 508. User device 504 may be either a stationary device or a mobile device and may include, for example, a laptop personal computer, a desktop personal computer, a mobile computing device, etc. and may include, for example, client machine 240, device 107, 109, or client computers 411-414. User device 504 may have one or more processors 542 for controlling overall operation of user device 504 and its associated components, including but not limited to user device RAM 544, user device ROM 516, user device Input/Output (I/O) module 518, and user device memory 520. I/O module 534 may include, but is not limited to, for example, camera, touch screen, display, optical reader, IR sensor, keypad, keyboard, mouse, and/or stylus (or other input device(s)) through which a user of mobile device 508 may provide input, and may also include one or more of a speaker for providing audio output and one or more of a video display device for providing textual, audio-visual, and/or graphical output, and a motor for providing haptic/sensory output. User device 504 may operate in a LAN networking environment and may be connected to a LAN through LAN interface 522. User device 504 may additionally or alternatively be connected to and operated within a WAN networking environment and connected to a WAN via WAN interface 524. User device 504 may run, for example, Windows, MacOS, Linux, Android OS, iOS, etc. or similar operating system. User device 504 may access a virtual session server (e.g., remote server 510, virtualization server 301) via a network connection, for example a WAN. User device 504 may access a virtual session 512*a* (generally virtual session 512) hosted and supported by the virtual session server (e.g., remote server 510, virtualization server 301). A virtual client agent installed on user device 504 may facilitate access to virtual session 512*a*. Virtual session 512*a* may include a virtual desktop 514*a* (generally virtual desktop 514*a*) or application which the user device 504 may access using the virtual client agent executing on the user device 504.

Environment 500 may further include mobile device 508. Mobile device 508 may include a personal mobile device of the user 502. Alternatively, mobile device 508 may be an enterprise mobile device provided by an enterprise for the use of user 502. Additionally or alternatively, mobile device 508 may be a personal device in a "Bring Your Own Device" (BYOD) environment in which the user may utilize the mobile device 508 for both personal and enterprise use. Mobile device 508 may have one or more processors 526 for controlling overall operation of mobile device 508 and its associated components, including but not limited to mobile device RAM 528, mobile device ROM 530, mobile device Input/Output (I/O) module 534, and mobile device memory 520. I/O module 534 may include, but is not limited to, for example, camera, touch screen, display, optical reader, IR sensor, keypad, keyboard, accelerometer, and/or stylus (or other input device(s)) through which a user of mobile device 508 may provide input, and may also include one or more of a speaker for providing audio output and one or more of a video display device for providing textual, audiovisual, and/or graphical output, and a motor for providing haptic/sensory output. Mobile device 508 may operate in a LAN networking environment and may be connected to a LAN through LAN interface 536. Mobile device 508 may additionally or alternatively be connected to and operated within a WAN networking environment and may be connected to a WAN via WAN interface 538. Mobile device 508 may run, for example, Android OS, iOS, etc. or the like operating system. Mobile device 508 may execute a mobile workspace/client agent 540 software or application. The mobile workspace/client agent 540 software may facilitate communications between mobile device 508 and remote resources (e.g., remote server 510) and/or virtualized resources. According to aspects, mobile device 508 may access a virtual session server (e.g., remote server 510, virtualization server 301) via a network connection, for example a WAN. Mobile device 508 may access virtual session 512b (generally virtual session 512) hosted and supported by the virtual session server (e.g., remote server 510). The mobile client agent executing on mobile device 508 may facilitate access to virtual session 512b. Virtual session 512b may include a virtual desktop 514b (generally virtual desktop 514) which the mobile device 508 may access using the mobile client agent 540 executing on mobile device 508.

Remote server 510 may be an example of virtualization server 301 computing device 201, or management server 410. According to aspects herein, remote server 510 may host and support virtual desktop 514 and virtual session 512 accessed by user device 504 and/or mobile device 508. According to other aspects, remote server 510 may not host and support virtual desktop 514 or virtual session 512 but may be in working communication with one or more additional servers (e.g., virtualization server 301, management server 410) that may host and support virtual desktop 514 and virtual session 512. User device 504 and mobile device 508 may communicate with remote server 510 as described herein. Remote server 510 may have one or more processors for controlling overall operation of remote server 510 and its associated components, including remote server RAM, remote server ROM, remote server Input/Output (I/O) modules, and remote server memory.

Figure 6A:
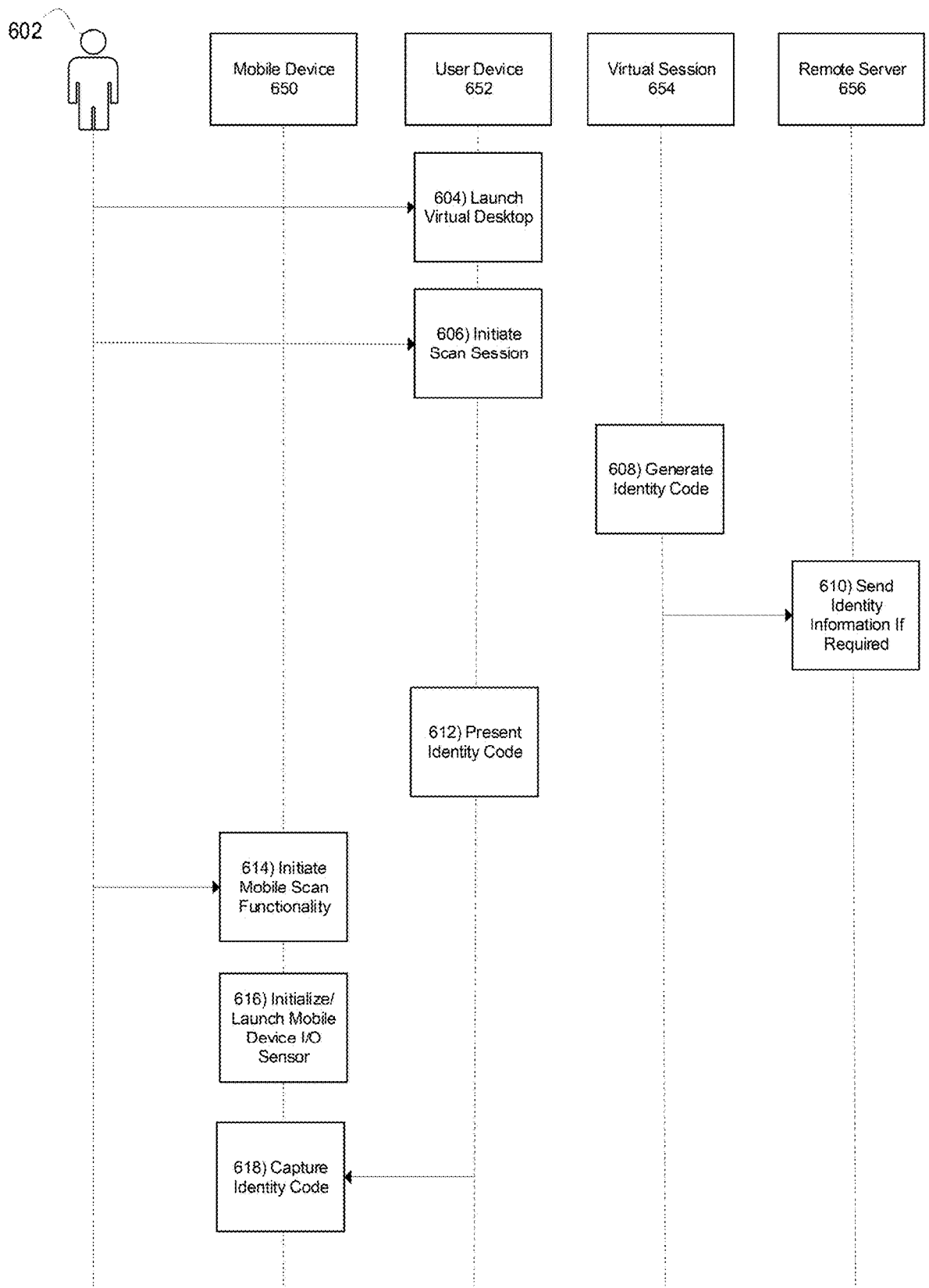
FIGS. 6A-6C depict an illustrative event sequence for deploying and implementing one or more illustrative aspects of scan functionalities for virtual sessions as described herein.
Figure 6B:
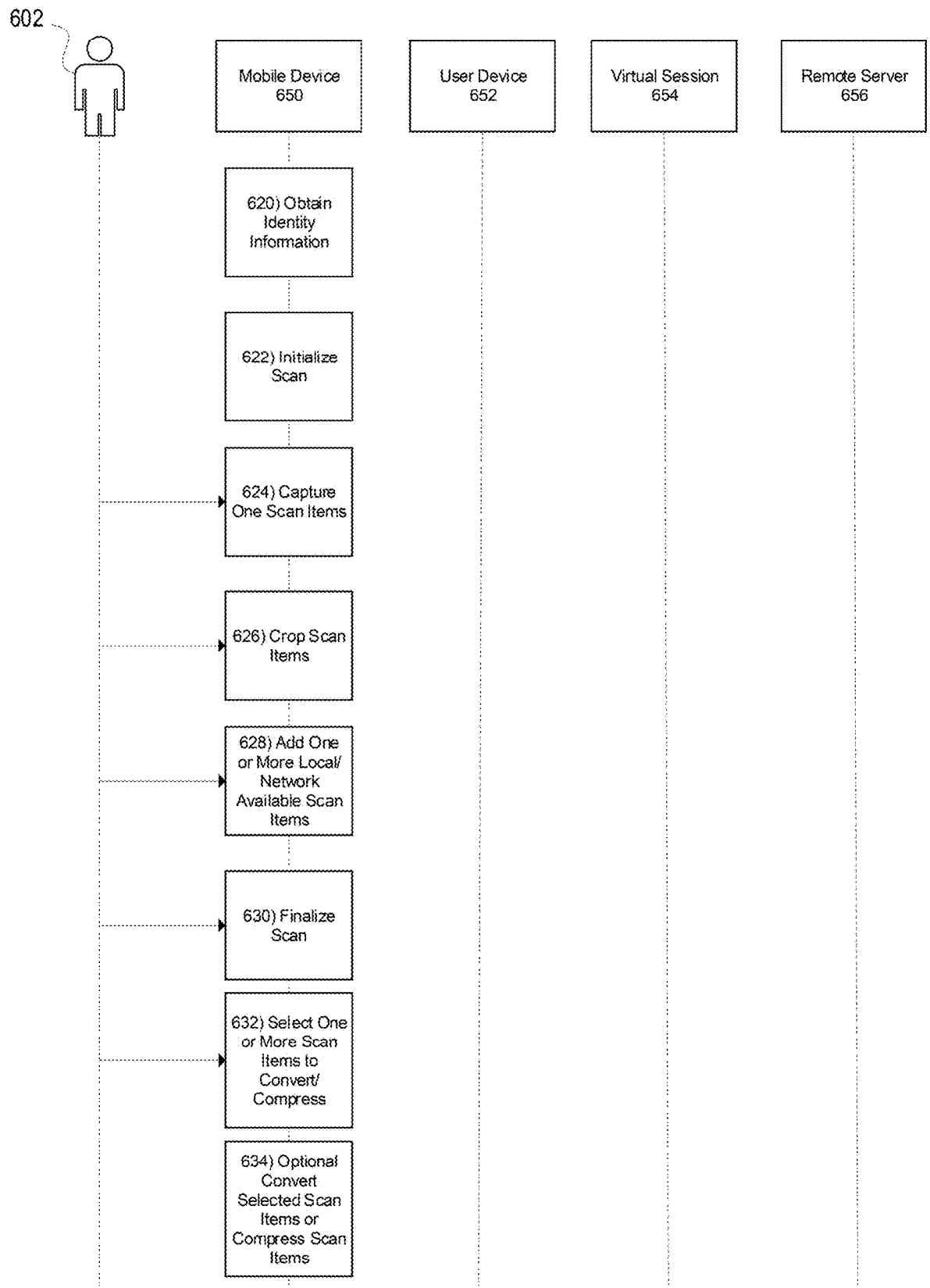
Figure 6C:
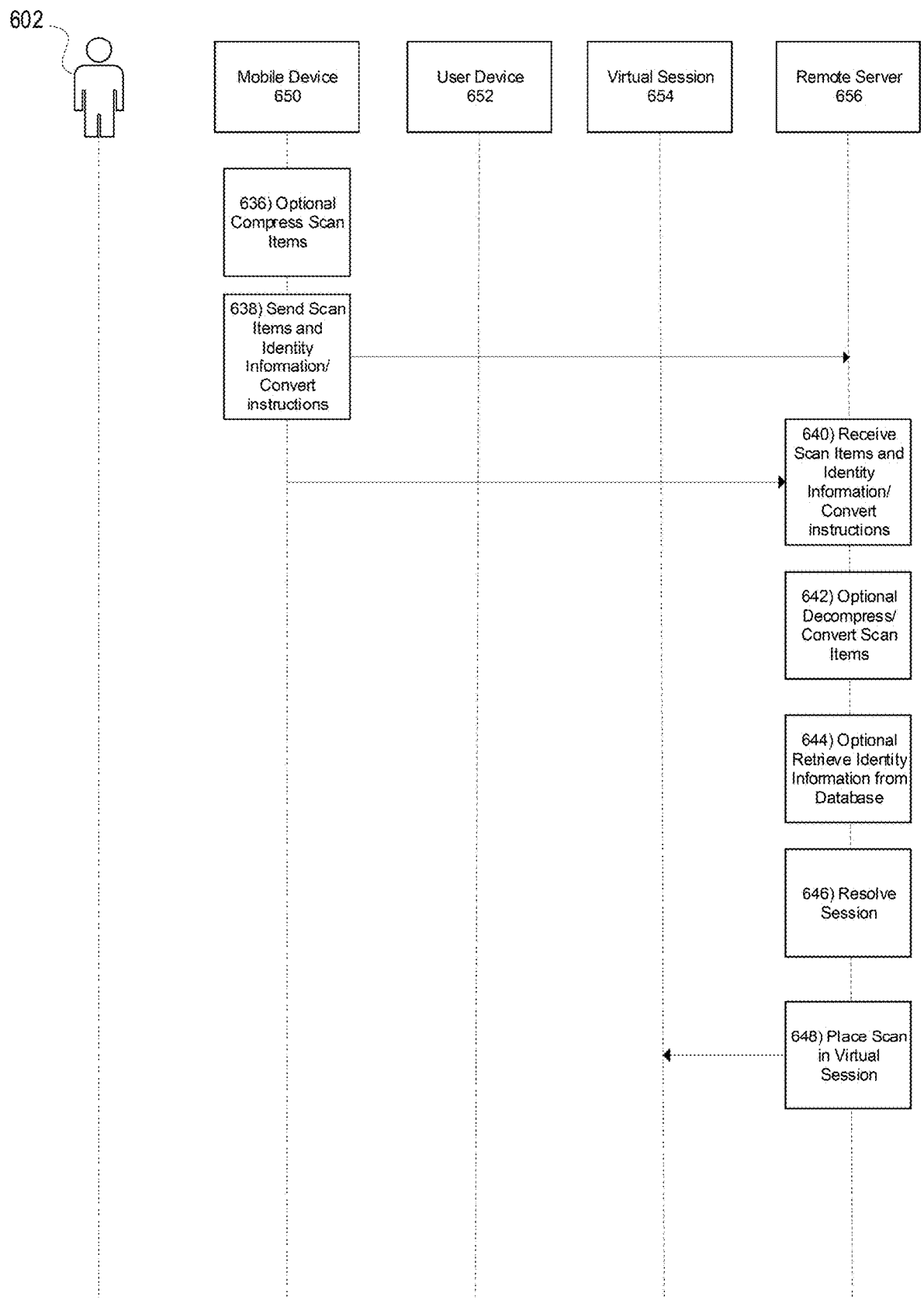

FIGS. 6A-6C depict an illustrative event sequence for deploying and implementing one or more illustrative aspects of scan functionalities for virtual sessions as described herein. The sequence may include user 602 (user 602 may be an example of user 502), mobile device 650 (mobile device 650 may be an example of mobile device 508), user device 652 (user device 652 may be an example of user device 504), virtual session 654 (virtual session 654 may be an example of virtual session 512), and remote server 656 (remote server 656 may be an example of remote server 510). Referring to FIG. 6A, at step 604 user 602 may launch and access a virtual session on user device 652. For example, user 602 may access a virtual client agent executing on user device 652. The virtual client agent may communicate with a virtual session server (e.g., virtualization server 301, remote server 656 according to aspects). The virtual client agent may access a virtual session 654 that is hosted and supported by the virtual session sever (e.g., virtualization server 301, remote server 656 according to aspects).

At step 606, a scan session may be initiated. For example, user 602 may navigate to and select a scan initiation option within virtual session 654 on user device 652. In response to the user 602 selection of the scan initiation option, the scan session may be initiated. Upon scan session initiation, identity information may be retrieved and/or generated. For example, identity information, that may be retrieved and/or generated, may include some or all of, but is not limited to, a user identifier, a user name, a virtual session identifier, a user device identifier, a virtual desktop identifier, an authentication token, and a unique identity code identifier (for example a Universally Unique Identifier (UUID) that identifies the identity code). According to aspects, identity information may further include a unique scan session identifier (for example a UUID that uniquely identifies the scan session). The unique scan session identifier may also be associated with some or all of the identity information described above. According to aspects, the identity information may be retrieved and/or generated by virtual session 654.

At step 608, An identity code may be generated. For example, virtual session 654, being accessed by user device 652, may generate an identity code. According to aspects, user device 652 may generate the identity code. The identity code may include identity information embedded in the identity code. According to aspects, the embedded identity information may include at least the user device identifier and the virtual session identifier embedded in the identity code. Additionally or alternatively, the embedded identity information may include additional or alternative identity information. For example, embedded identity information may include, but is not limited to, one or more of a user identifier, a username, a virtual session identifier, a session token, etc. embedded in the identity code. According to aspects, one or more of the described embedded identity information may be omitted from the identity code. The embedded identity information may include further information that may assist remote server 656 in resolving virtual session 654 and user device 652 as described below in further detail (see, e.g., steps 644-648).

According to alternative aspects, the embedded identity information may include the unique scan session identifier embedded in the identity code. According to such aspects, further identity information may be retrieved and/or generated (as described above) but may not be embedded in the identity code. For example, according to aspects that include the unique scan session identifier (that is associated with the identity information), a user device identifier, a virtual session identifier and/or any other identity information described above may be retrieved and/or generated but may not be embedded in the identity code along with the unique scan session identifier. Additionally or alternatively, according to aspects including the unique scan session identifier, the embedded identity information may also include some or all of the identity information described above (e.g., user identifier, a username, a virtual session identifier, a user device identifier, a virtual desktop identifier, an authentication token, and a unique identity code identifier, etc.).

According to aspects herein, the identity code, or portions thereof, may take various forms. For example, according to aspects, the identity code, or portions thereof, may take the form of a quick response (QR) code. According to such aspects, the embedded identity information may be embedded in the QR code. Additionally or alternatively, the identity code, or portions thereof, may take the form of an audio code. Additionally or alternatively, the identity code, or portions thereof, may take the form of a haptic code. Additionally or alternatively, the identity code, or portions thereof, may be an alphanumeric code. Additionally or alternatively, the identity code, or portions thereof, may take the form of an optic code. Alternative identity code forms, as would be appreciated by a person of ordinary skill in the art, are contemplated herein and may be intimated with reference to the present disclosure. Additionally, the identity code may take multiple forms. For example, a portion of the identity code may take the form of a QR code, and a portion of the identity code may take an alternate (e.g., alphanumeric) form.

At step 610, the identity information may optionally be sent to remote server 656. For example, virtual session 654 may send some or all of the identity information retrieved and/or generated at step 606 to remote server 656. According to aspects herein, step 610 may be performed according to aspects including a unique scan session identifier. According to such aspects, virtual session 654 may send to remote server 656 the embedded identity information including the unique scan session identifier, and along with the unique scan session identifier, the virtual session 654 may also send additional information which may be associated with the unique scan session identifier. The additional information may include, for example, but is not limited to, the user device identifier, the virtual session identifier, and further information that may assist remote server 656 in resolving virtual session 654 and user device 652 from which the scan session originated (see, e.g., steps 644-648). According to such aspects, remote server 656, may receive and store in a database the sent unique scan session identifier and additional information. The additional information (e.g., user device identifier, virtual session identifier, virtual desktop identifier) may be retrieved from the database at a later time using the unique scan session identifier. According to aspects, step 610 may be performed by user device 652 as opposed to virtual session 654. According to aspects, step 610 may be performed before or after step 608.

At step 612, the identity code (e.g., generated at step 608) may be presented by user device 652. User device 652 may present the identity code for subsequent capture of the identity code, for example, by mobile device 650. For example, according to aspects wherein the identity code takes the form of a QR code, user device 652 may display the identity code on a display of the user device 652. According to other aspects, the identity code, or portions thereof, may be presented variously. For example, according to aspects wherein the identity code, or portions thereof, takes the form of an audio code, user device may output the audio code from an audio output device (e.g., a speaker) of user device 652. According to aspects where the identity code, or portions thereof, takes the form of a haptic code, user device 652 may present the code using a haptic output. According to aspects wherein the identity code, or portions thereof, takes the form of an alphanumeric, the alphanumeric code may be displayed on a display of user device 652, or the alphanumeric code may be presented in audio form from an audio output device of user device 652.

At step 614, mobile scan functionality may be launched on mobile device 650. For example, user 602 may access mobile device 650. User 602 may navigate to and open a mobile workspace/client agent 540 on mobile device 650. Mobile workspace/client agent 540 may be a software application that may execute on mobile device 650. The mobile workspace/client agent 540 may facilitate communications with remote resources, virtualized resources, and/or remote server 656. According to aspects, mobile workspace/client agent 540 may facilitate the access of virtual sessions 654 hosted by virtualization servers (e.g., remote server 656 according to aspects, virtualization server 301). User 602 may navigate to the mobile workspace/client agent 540 application and select a mobile scan option within the mobile workspace/client agent 540. Mobile device may detect the user 602 selection of the mobile scan option within the mobile workspace/client agent 540. In response to the detection of the selection of the mobile scan option, mobile scan functionality may be initiated on mobile device 650.

At step 616, an Input/Output (I/O) sensor of mobile device 650 may be initialized for capture of the identity code. For example, in response to detecting the user selection of the mobile scan option, the mobile device 650 may initialize and/or launch at least one I/O sensor (e.g., camera, microphone, accelerometer, infrared (IR) sensor, etc.) of the mobile device 650. According to aspects, mobile device 650 may initialize and/or launch a mobile device 650 camera. According to other aspects, the mobile device may additionally or alternatively initialize and/or launch a mobile device microphone. According to other aspects the mobile device may initialize and/or launch an I/O touch screen. Additional or alternative I/O (e.g., IR, accelerometer, etc.) sensors may be initialized and/or launched to capture the identity code being presented by user device 652 as would be appreciated by a person of ordinary skill in the art and as may be intimated from the present disclosure.

At step 618, the identity code may be captured by mobile device 650. According to aspects, the identity code being presented by user device 652 may be captured by the initialized I/O sensor of mobile device 650. For example, according to aspects, the identity code may be in the form of a QR code. The QR code may be displayed on a display of user device 652. According to such aspects, the camera of mobile device 650 may capture the QR code being displayed on the display of user device 652. Further, according to such aspects, user 602 may direct the initialized camera of mobile device 650 at the QR code being displayed on a display of user device 652. Mobile device 650, as facilitated by a mobile device 650 camera, may subsequently capture the QR code being displayed on the display of user device 652.

According to other aspects, the identity code, or portions thereof, may be captured variously. For example, according to aspects the identity code, or portions thereof, may take the form of an audio code. Accordingly, the identity code, or portions thereof, may be captured via an audio input sensor (e.g., microphone) of mobile device 650. According to additional or alternative aspects the identity code, or portions thereof, may take the form of one or more alphanumeric codes. Accordingly, the identity code, or portions thereof, may be captured via a touch I/O screen or other alphanumeric input device. For example, according to such aspects, user 602 may use a virtual keyboard displayed on a touch I/O screen of mobile device 650 to input the one or more alphanumeric identity codes. Alternatively, the user may use a physical alphanumeric input (e.g., keyboard) connected to mobile device 650 to input the one or more alphanumeric identity codes. According to additional or alternative aspects, one or more alphanumeric codes may be displayed on the display of user device 652. According to such aspects, the one or more alphanumeric codes may be captured via the camera of mobile device 650. According to other aspects, the one or more alphanumeric codes may be presented as audio from user device 652. According to such aspects, the one or more alphanumeric codes may be captured using an audio input sensor (e.g., microphone) of mobile device 650. According to additional or alternative aspects, the identity code, or portions thereof, may take alternate forms as would be appreciated by a person of ordinary skill in the art (e.g., haptic identity code, IR identity code, optical identity code). Accordingly, such identity codes may be captured by mobile device 650 with the assistance of an appropriate I/O sensor.

Referring to FIG. 6B, at step 620, mobile device 650 may obtain the embedded identity information from the identity code. As described, such identity information may include, but is not limited to, one or more of, for example, a user identifier, a username, a virtual session identifier, a user device identifier, a virtual desktop identifier, an authentication token, a unique identity code identifier, and/or a unique scan session identifier. Mobile device 650 may read and/or decode the identity code to obtain the identity information. According to aspects wherein the identity code takes the form of a QR code, mobile device 650 may read and/or decode the embedded identity information (e.g., unique scan session identifier, user device identifier, and/or virtual session identifier, etc.) from the captured identity code QR code. According to aspects wherein the identity code, or portions thereof, takes the form of an audio code, mobile device may recognize the code from the audio. According to alternative aspects, as described, the identity code, or portions thereof, may take various forms (e.g., alphanumeric visual code, alphanumeric audio code, haptic code, IR code, optical code, etc.). Accordingly, the identity information may be obtained from the identity code variously.

At step 622, in response to capturing the identity code, mobile device 650 may initialize a scan for the addition and/or capture of one or more scan items to the scan by mobile device 650. For example, initialization of the scan may include displaying, by mobile device 650, an add scan items option for adding one or more scan items to a scan. User 602 may select the add scan items option. Mobile device 650 may detect user selection of the add scan items option. In response to detecting the selection of the scan items option, mobile device may initialize the scan. Scan initialization may include launching of a camera of mobile device 650. Alternatively, in response to capturing the identity code, mobile device 650 may automatically initialize the scan and automatically launch the camera of mobile device 650. Additionally or alternatively, the initialization of the scan may include displaying, by mobile device 650, and the subsequent selection by user 602, of one or more options to add scan items to the scan by image capture via the camera of mobile device, to add (e.g., attach) scan items (e.g. images or files) saved locally, or to add scan items (e.g., images or files) that are available over a network connection, as will be described in greater detail below. For example, upon scan initialization, mobile device 650 may present an add scan items via image capture option. Upon selection of such option, mobile device 650 may launch a camera for the capture one or more scan item images to be added to the scan. Additionally or alternatively, upon scan initialization, mobile device 650 may present an add locally stored (i.e., locally available) images/files option to add (e.g., attach), as scan items to the scan, images/files that are saved to the local memory storage of mobile device 650 (e.g., mobile device ROM 530 and/or mobile device memory 532). Upon selection of the add local images/files option, user 602 may browse the local storage of mobile device 650 and select one or more locally saved scan items (e.g., images or files) to add (e.g., attach) to the scan. Additionally or alternatively, upon scan initialization, mobile device 650 may present an add network images/files option to add (e.g., attach) scan items (e.g., images or files) to the scan that are available to user 602 over a network connection. Examples of scan items that may be available to user 602 over a network connection may include images and/or files that are saved to a cloud storage (e.g., Microsoft OneDrive™, Google Drive™, etc.). User 602 may be presented with multiple network storage options for accessing one or more of different network storages. For example, user 602 may be presented with the option to add files from, for example, Microsoft OneDrive™, iCloud™, Google Drive™, etc. Upon selection of one of such an add network scan items option, user 602 may be presented with the ability to navigate to the selected network storage and to select one or more network available images/files (i.e., scan items) to add (e.g., attach) to the scan. According to aspects, user 602 may be presented with a single option to capture or add one or more scan items to a scan (e.g., an "Add/Capture Images to Scan" option). Upon selection of such an option, user 602 may be presented with additional options to either: capture one or more images using mobile device 650 camera; to add one or more locally stored images/files; or to add one or more network available images/files. According to aspects, scan initialization may accompany and/or be accompanied by one or more graphical user interfaces (GUIs). Thus, scan initialization as described may be clarified with, among other things, reference to the description of illustrative GUIs of FIGS. 7D and 7E.

As used herein, "scan items" may refer to items that are added or may be added to a scan. Such items may include, but are not limited to images (of any file format), whether captured within the scan session or before the scan session. Further, such scan item images may be added to a scan variously. For example, such scan item images may be added to a scan by capturing an image, for example, with the camera of mobile device 650 during a scan workflow. Additionally or alternatively, scan item images may be added to a scan from a local device storage, for example, from a mobile device 650 local storage, whether available from the local storage before or during the scan session. Additionally or alternatively, scan item images may be added to a scan from a network available storage (e.g., a cloud storage) that may be accessed, for example, by mobile device 650 via a network connection. "Scan items" may additionally or alternatively refer to files, in any file format, whether created within the scan session or before the scan session. Such scan item files may include but are not limited to, for example, Portable Document Format (PDF) files, document file format files (e.g., DOC, HTML, RTF, WPD, etc.), or any other type of file. Scan item files may be added to a scan by capturing an image, for example, with the camera of mobile device 650 during a scan workflow. Additionally or alternatively, scan item files may be created prior to a scan session and may be added to a scan from a local device storage, for example, from a mobile device 650 local storage, whether available from the local storage before or during the scan session. Additionally or alternatively, scan item files may be created prior to a scan session and may be added to a scan from a network available storage (e.g., a cloud storage) that may be accessed, for example, by mobile device 650 via a network connection. Additionally, scan items may be referred to interchangeably herein as "scan items," "scan," "images," "files," "images/files," and/ or "files/images." A "scan" may consist of one or more scan items.

According to aspects, options to add scan items via image capture, local storage, or network storage may be selected interchangeably at any time during a scan session. As an example, the user may first select the capture an image option and proceed to capture an image (i.e., scan item) to add to the scan (described in more detail herein). Following image capture it may be desirous to add additional scan items to the scan. User 602 may select an option to, for example, "Add/Capture Images to Scan" (see step 628). Upon selection of such an option, user 602 may again be presented with multiple options, for example: to capture an image (i.e., scan item), to add (e.g., attach) one or more locally saved scan items, or to add (e.g., attach) one or more network available scan items. As an example, the user may select the add a locally available scan items option. Upon selection of such option, the user may navigate to and select one or more locally saved scan items to add (e.g., attach) to the scan, where the scan includes the prior captured image. Upon completion of adding the locally stored scan item(s), user 602 may again be presented with "Add/Capture Images to Scan" option (see step 628). Upon selection of such an option, user 602 may again be presented with multiple options, for example: to capture an image (i.e., scan item), to add (e.g., attach) one or more locally saved scan items, or to add (e.g., attach) one or more network available scan items. As an example, the user may select the add (e.g., attach) a network available scan item. Upon selection of such option, the user may be presented with the ability to navigate to a selected network storage and to select one or more network available scan items to add (e.g., attach) to the scan (where the scan already includes the first captured image, and the subsequently added locally available scan item(s)). The above order of adding captured images (i.e., scan items), locally available scan items and/or network available scan items is for illustrative purposes only. According to aspects, a user may add captured images, locally available scan items and/or network available scan items to a scan in any order. Additionally, a scan may include some or all of one or more captured images, one or more locally available scan items and one or more network available scan items.

At step 624, mobile device 650 may capture one or more images as scan items to add to the scan. For example, if at step 622 (or step 628) user 602 selects a capture image option, the camera of mobile device 650 may be launched and user 602 may direct the camera at an object to be captured (i.e., added to scan). User 602 may select a capture option on mobile device 650 to capture an image of an object to be added to the scan. According to aspects, the mobile device 650 may capture one or more images of any object. According to further aspects, the object captured may include one or more documents. According to additional aspects, user 602 may have the option to crop (described in more detail) each image subsequent to capturing it.

For example, at step 626, one or more of the scan items may be cropped. According to aspects, each scan item may be cropped immediately after capture of the specific scan item (e.g., image). Additionally or alternatively, the one or more captured and/or added scan items may be cropped out of order. For example, user 602 may capture a first image of a document using the camera of mobile device 650. User 602 may or may not crop the image of the first document. Then, user 602 may capture a second image of a document using the camera of mobile device 650 (in accordance with the workflow described herein). User 602 may or may not crop the second image. Subsequently, user 602 may select the first or second image to be cropped or to adjust a previously selected crop. Aspects of the crop feature are discussed in further detail below (with reference to FIGS. 7F, and 7G).

At step 628, one or more locally available scan items, one or more network available scan items and/or one or more captured images scan items may be added to the scan. As noted above with respect to step 622, following the addition of each captured image and locally available or network available scan item, user 602 may be presented with multiple options. For example, following the addition of each captured image and locally available or network available scan item, user 602 may be presented with options to: capture an additional image via a camera of mobile device 650, add an additional one or more locally available scan items, or add an additional one or more network available scan items. As noted above, user 602 may add scan items from any source in any order. It should be noted, that steps 624, 626, and 628 may be executed in any order. Additionally, each of steps 624, 626, and 628 may be executed more than once in a single scan. Additionally, a scan may not include all of steps 624, 626, and 628.

At step 630, the scan may be complete. For example, when no further scan items are to be added to the scan, user 602 may select a complete scan option. According to aspects, a complete scan option may be presented to user 602 following the addition of each scan item along with the option to add additional scan items. According to aspects, upon selection of the complete scan option, user 602 may be presented with one or more further options to process the scan items and scan and described in more detail herein.

At step 632, user 602 may select one or more of the one or more scan items for conversion from a first file format to a second file format. For example, following the selection of the complete scan option, user 602 may be presented with options to convert one or more of the scan items from one or more first file formats to one or more second file formats. As an example, a scan may include four captured images in, for example, a JPG file format (alternatively, images may be captured in an alternative image format (e.g., PNG, BMP etc.)). User 602 may select one or more of the captured images (e.g., all four images) for conversion, and the user may select one or more of a second file format (e.g., PDF, DOC, DOCX, etc.) to which to convert the selected images. According to aspects herein, user 602 may only select some of the one or more scan items for conversion. Following the above example, user 602 may only select two of the four captured images for conversion. According to alternative aspects herein, user 602 may select all of the scan items for conversion. According to further aspects, user 602 may select a single second file format to which to convert the selected scan items. For example, user 602 may select a PDF file format as the second file format to which to convert all selected scan items. Alternatively, according to some aspects, user 602 may select multiple second file formats for multiple scan items respectively. For example, continuing the above example, the user may select two of the four images for conversion. Of the two selected scan items, the user may select that the first selected scan item be converted to a PDF and the second selected scan item be converted to a word processor document format (e.g., DOC). Any number of formats and scan items are contemplated herein. According to some aspects, upon conversion, all of the selected scan items may be converted into a single second format file or multiple second format files with each second format file containing one or more of the converted scan items. For example, following the above example, a user may select three of four images for conversion from a first file format of JPG to a second file format of PDF. Upon conversion, all three selected images may be converted into a single PDF file. Alternatively, each of the three selected images may be converted into individual PDF files. Alternatively, as a further example, the selected images may be converted into one PDF including one converted image and one PDF including two converted images. As a further example, user 602 may have captured four images to the scan. User 602 may select two images to be converted to a PDF and two images to be converted to a DOC. The two images to be converted to PDF may be converted into a single PDF second format file including both selected images or, alternatively, individual PDF second format files. Similarly, the two images to be converted to DOC may be converted into a single DOC second format file including both selected images or individual DOC second format files. All conversion and formatting discussed with respect to captured images is similarly contemplated with respect to other scan items, for example, scan items that may have been added (e.g., attached) to the scan from local mobile device 650 storage or from network available storage.

At step 634, mobile device 650 may optionally convert the selected scan items as selected by user 602 for conversion. According to aspects, mobile device 650 may or may not have the capabilities to convert the scan items as selected by user 602. For example, user 602 may have requested to convert all captured images of a scan, saved as a Bitmap (BMP) first file format files, to a PDF second file format file. Mobile device 650 may or may not have the capabilities to convert a Bitmap (BMP) or JPG to a PDF format. If mobile device 650 does have the capabilities to convert the scan items as selected, then mobile device 650 may convert the scan items. If, in the alternative, mobile device 650 does not include the capabilities to convert the scan items as selected by user 602, mobile device 650 may save the conversion selections as conversion instructions (e.g., to be used as described in steps 638-642) but mobile device 650 may not convert the scan items.

Referring to FIG. 6C, at step 636, mobile device 650 may optionally compress one or more scan items into an archive file (e.g., ZIP archive). For example, according to aspects where mobile device 650 does not support the conversion of the scan items as selected, mobile device 650 may instead compress the one or more scan items into a compressed archive file (e.g., a ZIP archive). According to an alternative example, as noted above, user 602 may only select some of the scan items for conversion, according to such examples, mobile device 650 may compress into a compressed archive file those scan items which have not been selected for conversion. According to other aspects, mobile device 650 may compress scan items, whether converted or not, and whether selected for conversion or not, into a compressed archive file.

At step 638, mobile device 650 may send the scan (i.e., the scan items), the identity information, and optionally the conversion instructions (as described with respect to step 634) to remote server 656. For example, according to aspects wherein mobile device 650 supports a selected conversion (as described with respect to step 634), mobile device 650 may convert the scan items as selected. Mobile device 650 may subsequently send the converted scan items to remote server 656. Similarly, according to aspects including compressed archive files or individually saved files (whether converted, compressed, or not processed) mobile device 650 may send the files as processed or not processed to remote server 656. Further, along with the scan (i.e., scan items), mobile device 650 may send the identity information (e.g., unique scan session identifier, user device identifier, virtual session identifier, etc.) obtained from the identity code to remote server 656. Additionally, according to aspects wherein mobile device 650 does not support the conversion of the scan items as selected, mobile device 650 may additionally send conversion instructions to remote server 501. For example, user 602 may capture four images as a scan. User 602 may select all four images to be converted from a first file format (e.g., BMP) into a single PDF second file format file. However, according to the example, mobile device 650 may not support the conversion of the selected images to PDF format. According to such an aspect, mobile device 650 may save the user conversion selection as conversion instructions and forward the conversion instructions to remote server 656 along with the captured images (as individual non-processed images or as a compressed archive file) and the identity information obtained from the identity code.

At step 640, remote server 656 may receive the scan items, the identity information an optionally the conversion instructions. For example, remote server 656 may receive that which was sent at step 638. According to aspects, as described above, the identity information may include an authentication token. According to such aspects, mobile device 650 and/or mobile workspace/client agent 540 may be authenticated with remote server 656 based on the authentication token received at remote server 656 as a part of the identity information.

At step 642, remote server 656 may optionally decompress a received compressed archive file, and or convert one or more scan items from a first file format to a second file format. For example, according to aspects wherein a selected conversion is not supported by mobile device 650, the selected conversion may be saved as conversion instructions and sent from mobile device 650 to remote server 656. According to such aspects, remote server 656 may execute the conversion instructions and convert the scan items accordingly. Any of the conversions contemplated with respect to mobile device 650 are contemplated with respect to remote server 656. Additionally or alternatively, as described, remote server 656 may receive some or all of the scan items as a compressed archive file. According to such aspect, remote server 656 may decompress the scan items.

At step 644, remote server 656 may optionally retrieve the identity information from a database. For example, as described, according to aspects including a unique scan session identifier, identity information (e.g., user device identifier, virtual session identifier, etc.) may be sent from user device 652 to remote server 656 and stored in a database by remote server 656 (see e.g., step 610). According to such aspects, the identity information stored in the database may be retrieved based on the unique scan session identifier sent from mobile device 650 and received by remote server 656.

At step 646, remote server may use the identity information (either received from mobile device 650 or retrieved from the database) to resolve virtual session 654. For example, remote server may use a username and/or user identifier to resolve the user associated with virtual session 654 and user device 652 from which the scan session originated. Additionally or alternatively, remote server 656 may use the virtual session identifier to resolve the virtual session from which the scan session originated. Additionally or alternatively, remote server 656 may use the user device identifier to resolve the user device 652 from which the scan session originated. According to further additional or alternative aspects, remote server may utilize some or all of the above-mentioned identity information to resolve virtual session 654 as described. Additionally, according to further additional or alternative aspects, remote server 656 may utilize additional information to resolve virtual session 654 as described. The additional information may or may not have been included in the identity information described herein.

At step 648, remote server 656 may place the scan in virtual session 654. Placing the scan in virtual session 654 may include placing the scan in virtual desktop 514 within virtual session 654. User 602 may then access the scan from virtual session 654 (e.g., virtual session 512a) being accessed by user device 652. For example, according to aspects, remote server 656 may be the same server that hosts and supports virtual session 654. According to such aspects, remote server 656 may have access to remote session 654 from which the scan session originated. According to such aspects, remote server 656 may place the scan in virtual session 654 from which the scan session originated. According to other aspects, remote server 656 may not be the same server that hosts and supports virtual session 654 but, according to such aspects, remote server 656 may be in working communication with the server that hosts and supports virtual session 654. Accordingly, remote server 656 may send the scan to the server that hosts and supports virtual session 654 with identification information to identify virtual session 654 from which the scan session originated. The server that hosts and supports virtual session 654 may subsequently place the scan in the appropriate virtual session 654 accessed by user 602.

According to aspects, as described, user device 652 (i.e., user device 504) may be omitted from environment 500. Accordingly, environment 500 may include user 602 (i.e., user 502) mobile device 650 (i.e., mobile device 508) and remote server 656 (i.e., remote server 510). According to such aspects, steps 604, and 606 may be accomplished via mobile device 650 (i.e., mobile device 508). For example, user 602 (i.e., user 502) may access a virtual session 654 (i.e., virtual session 512) and virtual desktop 514, assisted by the mobile workspace/client agent 540, and substantially as described in reference to step 604 in relation to user device 652 (i.e., user device 504). User may select a scan initiation option within virtual session 654 (e.g., virtual session 512b) accessed from mobile device 650 (i.e., mobile device 508). The scan session may be initiated substantially according to step 606 with use of mobile device 650 (i.e., mobile device 508) instead of user device 652 (i.e., user device 504).

According to such aspects, steps 608 and 612 may be omitted from the workflow. For example, according to aspects where the scan session is initiated from virtual session 654 (e.g., virtual session 512b) accessed by mobile device 650, mobile device 650 may already have access to the identity information (following step 608) without capturing it from another device. As such, generation of the identity code and presentation the identity code for capture may be omitted. Accordingly, steps 616, 618, and 620 may similarly be omitted from such a workflow. Thus, according to such aspects, scan initialization (as substantially described by step 622) may follow the initiation of the scan session and the retrieval and/or generation of the identity information (as substantially described by step 606). As will be understood by a person of ordinary skill in the art, according to aspects wherein the scan session is initiated from virtual session 654 (e.g., virtual session 512b) being accessed by mobile device 650, all steps described herein as being executed by user device 652 may be executed by mobile device 650. Further, some steps described as being executed by user device 652 may be omitted.

Figure 7A:
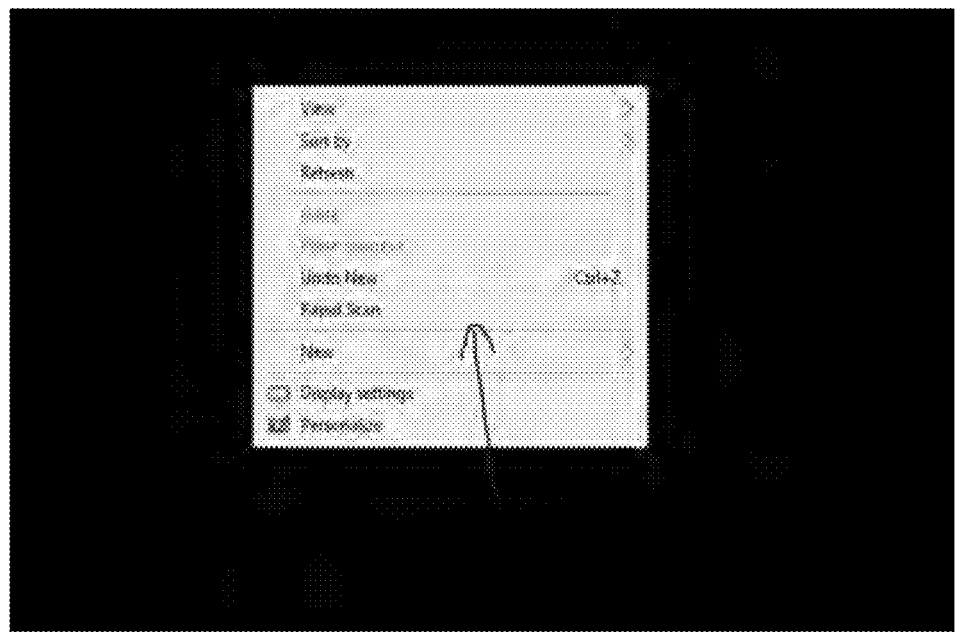
FIG. 7A depicts an illustrative graphical user interface (GUI) including a scan initiation option according to one or more illustrative aspects described herein.

As indicated herein, some steps of the present disclosure may include, may be associated with, may be initiated by, or may be in response to a user selection of a user option on a device which user 502 (e.g., user 602) has access to. Such user options may be presented, for example: within virtual session 512 (e.g., virtual session 654), on user device 504 (e.g., user device 652), within the mobile workspace/client agent 540 executing on mobile device 508 (e.g., mobile device 650), and/or otherwise on mobile device 508. Thus, the present disclosure may be more easily understood in light of exemplary graphical user interfaces (GUI) associated with an exemplary scan session. It is important to note, one or more additional GUIs may be present during a scan session, and one or more described GUIs may be absent from a scan session. The described GUIs are illustrated and described for illustrative purposes only. Some steps that may be included in a scan session (as may be described with relation to FIGS. 6A-6C) may not be described in relation to a GUI. As seen in FIG. 7A an illustrative GUI may include a scan initiation option. The GUI illustrated in FIG. 7A may be presented to user 502 on a display of user device 504 or on a display of mobile device 508. According to aspects herein, user 502 may navigate to the GUI illustrated in FIG. 7A by navigating to a context menu in virtual session 512. User 502 may then select the scan initiation option (e.g., "Rapid Scan") to initiate a scan session. It is contemplated that user 502 may initiate a scan variously (e.g., via a desktop icon scan initiation option, a start menu scan initiation option, etc.). Additionally, the title "Rapid Scan" is used for illustrative purposes only, the scan feature may be named variously and the scan initiation option may be titled variously.

Figure 7B:
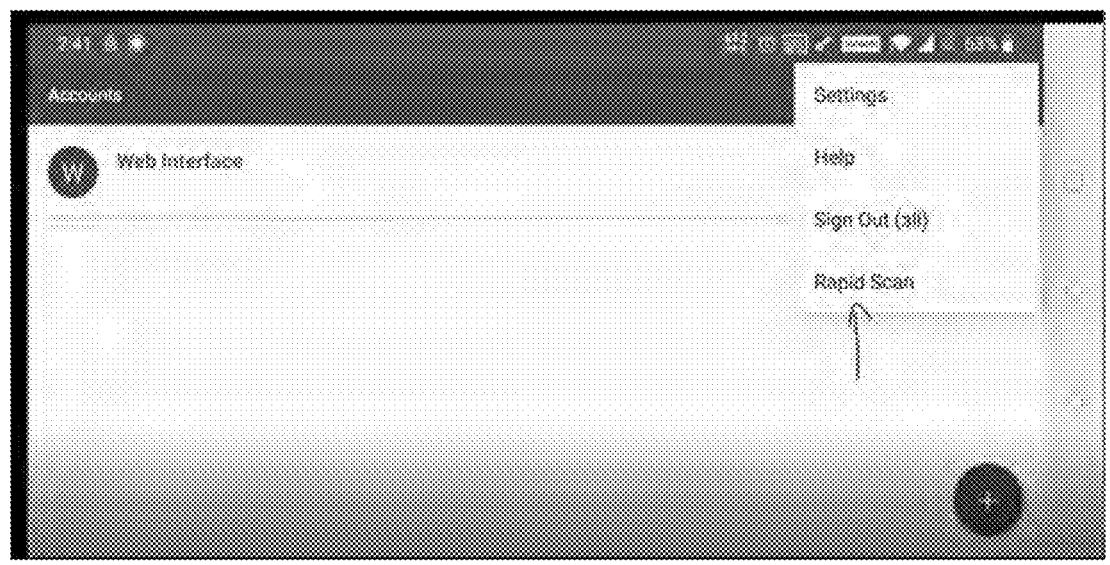
FIG. 7B depicts an illustrative GUI on a mobile device including a mobile scan option according to one or more illustrative aspects described herein.

Following scan initiation, as more fully described with reference to FIGS. 6A-6C, user device 504 may retrieve and/or generate identity information, generate an identity code, and optionally send identity information to remote server 510 (e.g., remote server 656). Additionally, as described more fully with reference to FIGS. 6A-6C, user device 504 may present the identity code (see, e.g., FIG. 7C) for capture by mobile device 508. As seen in FIG. 7B, an illustrative GUI on mobile device 508 may include a mobile scan option. The GUI illustrated in FIG. 7B may be presented to user 502 on a display of mobile device 508. According to aspects herein, user 502 may navigate to the illustrative GUI of FIG. 7B by launching a mobile workspace/client agent 540 application as described herein. User 502 may subsequently launch a menu within the mobile workspace/client agent 540 application. The menu may include the mobile scan option (e.g., "Rapid Scan" option as illustrated). User 502 may select the mobile scan option to launch the mobile scan functionality as described with relation to FIGS. 6A-6C and to continue the scan session from mobile device 508. The name and title "Rapid Scan" is used for illustrative purposes only. The scan feature may be named variously, and the mobile scan option may be titled variously. Additionally, it is contemplated that the mobile scan option may be presented variously (e.g., dedicated icon or option within the mobile workspace/client agent 540 application).

Figure 7C:
FIG. 7C depicts an illustrative GUI on a user device presenting an identity codes as a QR code and an illustrative GUI on a mobile device overlaying and capturing the identity code according to one or more illustrative aspects described herein.

As more fully described with relation to FIGS. 6A-6C, following the selection of the mobile scan option and the launch of the mobile scan functionality, an I/O sensor of mobile device 508 may be initialized and launched to facilitate the capture of the identity code being presented. For example, the identity code may be presented as a QR code on the display of user device 504. Identity information may be embedded in the QR code. According to such aspects, the identity code QR code may be captured by a camera I/O sensor of mobile device 508. FIG. 7C illustrates an illustrative GUI on user device 504 presenting identity code as a QR code and an illustrative GUI on mobile device 508 overlaying and capturing the identity code QR code. As illustrated in FIG. 7C, according to aspects herein, the identity code may be presented as a QR code. The QR code may be displayed on a display of user device 504 within virtual session 512 (e.g., virtual session 512a) being accessed by user 502, and in which user 502 selected the scan initiation option. Further as illustrated in FIG. 7C, according to aspects herein, the camera (i.e., I/O sensor) of mobile device 508 may be launched following selection of the mobile scan option. Subsequently, user 502 may capture the QR code (i.e., identity code) with the camera of mobile device 508. As more fully described above, other methods of identity code, or portions thereof, presentation and capture are contemplated herein.

Figure 7D:
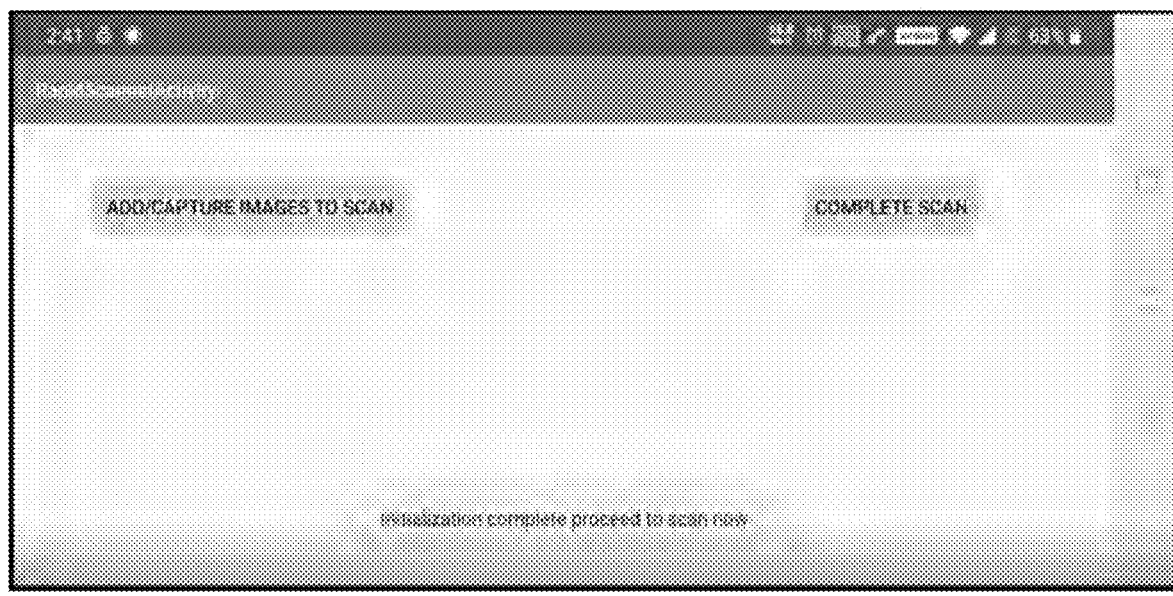
FIG. 7D depicts an illustrative GUI that may be presented to user on a mobile device upon scan initialization according to one or more illustrative aspects described herein.
Figure 7G:
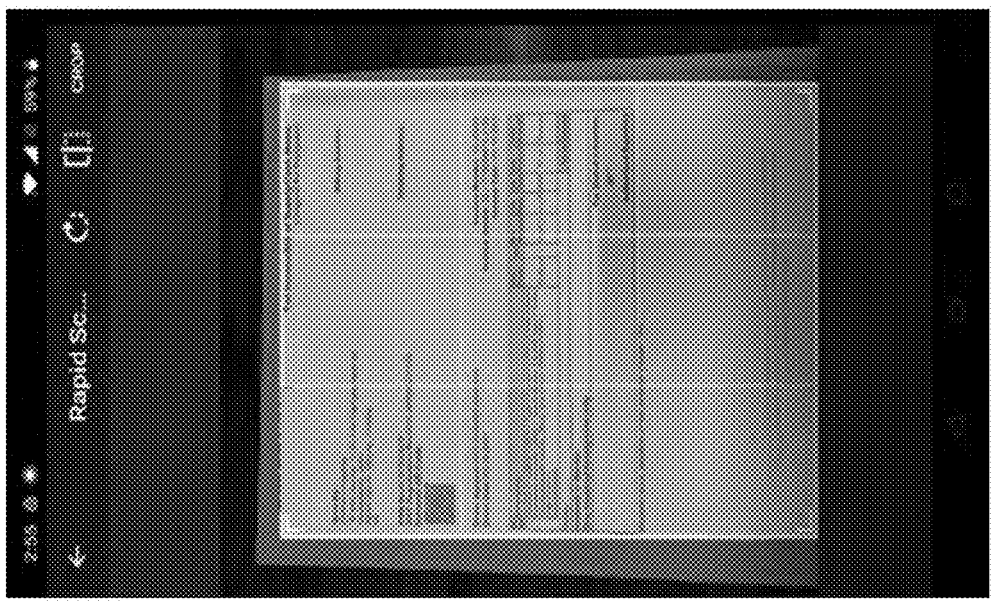
FIG. 7G depicts an illustrative GUI of an illustrative implementation of a crop feature according to one or more illustrative aspects described herein.

As described more fully with reference to FIGS. 6A-6C, following the capture of the identity code, mobile device 508 may obtain the identity information embedded in the identity code. Further, in response to the capture of the identity code and/or to the obtaining of the identity information, a scan may be initialized for the addition and/or capture of scan items from mobile device 508. FIG. 7D illustrates an illustrative GUI that may be presented to user 502 on mobile device 508 upon scan initialization. As seen in FIG. 7D, an illustrative GUI may include an image capture option (i.e., capture image scan item option), an add local/network scan items option, and a complete scan option. According to aspects, a GUI may include more or fewer options. Additionally, as illustrated in FIG. 7D, the image capture option and add local/network scan item options may be included as a part of the same option. Option titles depicted in FIG. 7D are for illustrative purposes only and option titles may vary. User 502 may select the image capture and/or add local/network scan items option.

Upon selection of the image capture and/or add local/network scan items option, user 502 may be presented with an additional GUI with further options. Such options may be described with reference to FIG. 7E. As seen in FIG. 7E, a GUI may include a source selection option for a selection of a source from which to add one or more scan items to a scan. For example, the source selection options may include: a launch camera option, an add locally stored scan items option, and one or more add network available scan items option. As described more fully with reference to FIGS. 6A-6C, as an example, user 502 may select the add locally stored scan items option. Upon selection of such an option, user 502 may be presented with a local file directory of folder, files and/or images (i.e., scan items) that are available on a local memory of mobile device 508. User 502 may browse the local file directory and select one or more locally saved scan items for addition to the current scan. Additionally, as described more fully with reference to FIGS. 6A-6C, user 502 may select the add network available scan items option (e.g., Microsoft OneDrive™ option illustrated in FIG. 7E). Upon selection of such an option, user 502 may be presented with one or more user interfaces to navigate to a network available file directory (e.g., file directory saved in the cloud). User 502 may select one or more network available images/files (i.e., scan items) for addition to the current scan. Additionally or alternatively, user 502 may select the camera option in order to use the camera of the mobile device 508 to capture one or more images (i.e., scan items) for addition to the current scan.

Figure 7F:
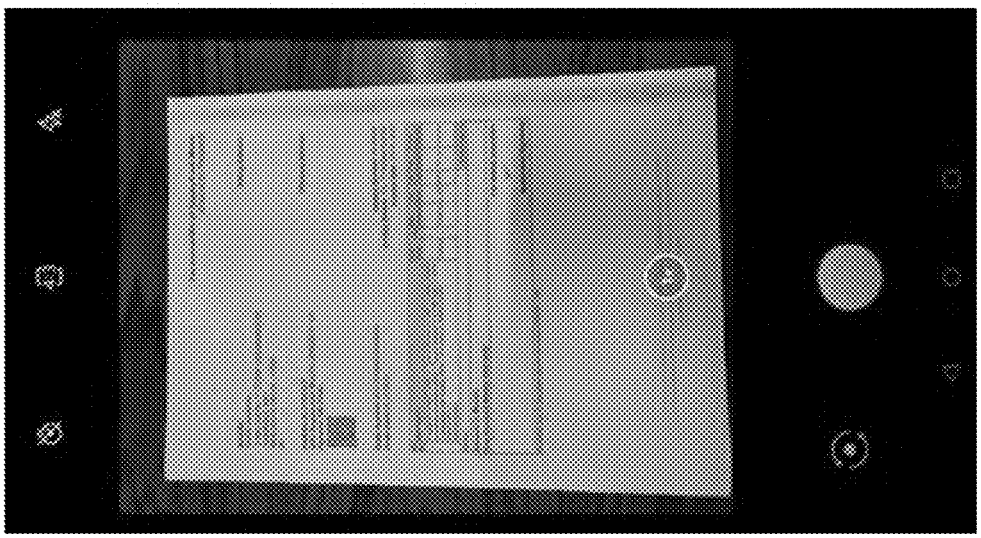
FIG. 7F depicts an illustrative GUI for capturing an image to be added to a scan according to one or more illustrative aspects described herein.
Figure 7E:
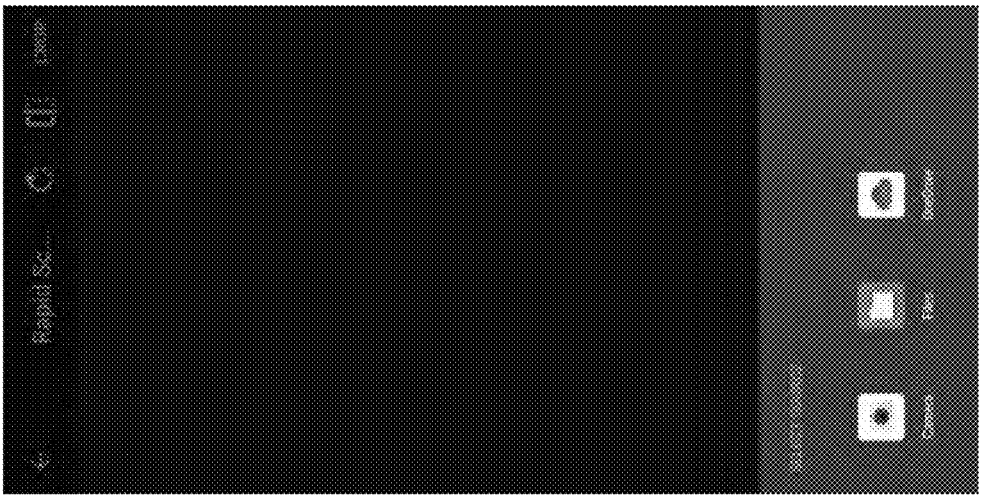
FIG. 7E depicts an illustrative GUI including a source selection option for a selection of a source from which to add one or more scan items to a scan according to one or more illustrative aspects described herein.

FIG. 7F illustrates an illustrative GUI for capturing an image to be added to a scan. Referring to FIG. 7F in response to a user 502 selection of the camera option (of, for example, FIG. 7E), the camera of mobile device 508 may be launched and user 502 may be presented with a GUI (e.g., GUI depicted in FIG. 7F) to facilitate the capturing of an image scan item. Referring to FIG. 7F, a mobile device 508 camera may capture an image of a document to be added to the scan (images of other objects, and/or entities are contemplated herein). User 502 may select a capture image option within the GUI to capture an image to be added to the scan.

Once an image is captured, according to one or more aspects herein, mobile device 508 may present an option to crop the captured image. d illustrates an illustrative GUI of an illustrative implementation of a crop feature. Such a GUI may include the ability for the user to select points (e.g., four points representing four corners of a captured document) representing a bounded area which user 502 wishes to keep, and a surrounding area which user 502 wishes to discard. Additionally or alternatively, the sides of the bounded area may be manually adjusted by user 502. According to aspects, the crop feature may automatically detect the boundaries of an object (e.g., the boundaries of a captured document) and may present the automatic boundary detection to the user for further adjustment. Once user 502 selects the bounded area which user 502 wishes to keep, user 502 may select a complete crop option. Upon selection of the complete crop option, mobile device 508 may crop the captured image to keep the bounded area of the image and discard that which falls outside the bounded area. According to aspects, the crop (i.e., keeping and discarding) may not be completed until the scan is completed. Thus, according to aspects, the crop area (i.e., bounded area) may be adjusted at a later time prior to scan completion. Additionally, it is contemplated that the crop function may or may not be automatically initiated following and image capture.

Figure 7J:
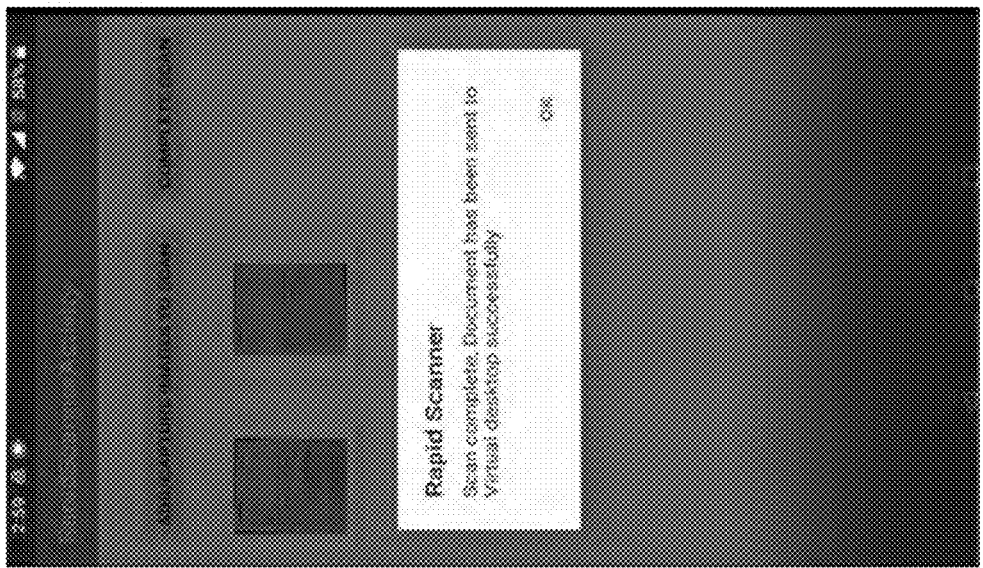
FIG. 7J depicts an illustrative GUI that may be presented upon the sending, from mobile device to remote server, of scan items, identity information, and optionally, conversion instructions according to one or more aspects described herein.
Figure 7I:
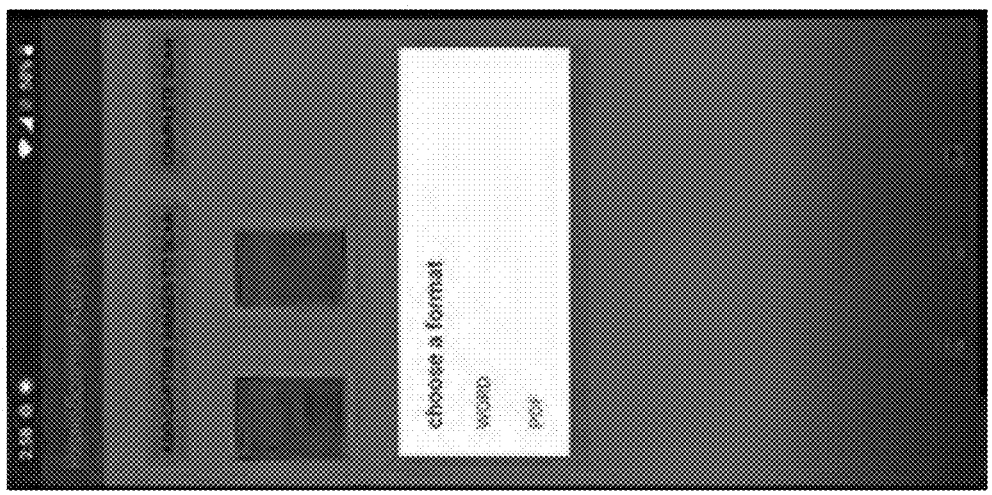
FIG. 7I depicts an illustrative GUI presenting options for scan conversion according to one or more aspects described herein.
Figure 7H:
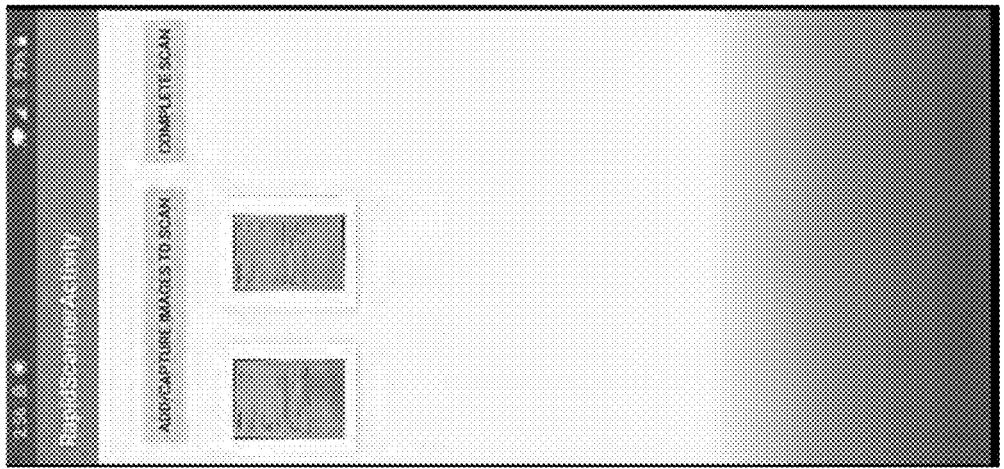
FIG. 7H depicts an illustrative GUI that may be presented during an ongoing scan session and following the addition of two scan items according to one or more illustrative aspects as described herein.

FIG. 7H depicts an illustrative GUI that may be presented during an ongoing scan session and following the capture of two scan items. As illustrated, following the capture of an image, or following each addition of locally available scan items or network available scan items, user 502 may be presented with a GUI indicating the previously added scan items and further presenting options to further capture one or more image scan items and/or add one more locally available or network available scan items. Upon selection of the option to further capture one or more image scan items or add one more locally available or network available scan items, the steps may proceed substantially as described with reference to FIGS. 7D-7G. Additionally, it is contemplated that user 502 may select one or more of the previously captured or added scan items (for example, from those which are listed in illustrative GUI depicted in FIG. 7H) to be cropped, or for an already selected crop region (i.e. bounded area described above) of a particular scan item to be modified. As described in relation to FIGS. 6A-6C, scan items (i.e., captured images, added locally available or network available images/files) may be captured, added from locally saved images/files and/or added from network available images/files in any order. Additionally, crop region selection and/or adjustment of any scan item may be accomplished at any time before scan completion. When user 502 desires to complete the scan, user 502 may select a complete scan option.

Upon selection of a complete scan option, and as more fully described with respect to FIGS. 6A-6C, user 502 may be presented with options to variously convert the scan items from a first file format to a second file format. FIG. 7I illustrates an illustrative GUI presenting options for scan conversion. Referring to FIG. 7I, upon selection of scan completion, user 502 may be presented with options to convert all scan items to a PDF or WORD (i.e., word processor document format, e.g., DOC, DOCX) file format (Additional or alternative file format options are contemplated as described in more detail herein). According to aspects, upon selection of a second file format option (e.g., PDF), all scan items may be converted into a single second file format file (e.g., a single PDF file). It is contemplated herein (as described with respect to FIG. 6B) for scan items to be converted variously. Additionally, as described above, it is contemplated that mobile device 508 may not support the conversion of the one or more scan items as selected. Accordingly, such conversion selections may be saved as conversion instructions to be executed by remote server 510 as described herein.

As described herein, following scan item conversion selection, the mobile device may convert the scan items from a first file format to a second file format as selected. Additionally or alternatively, mobile device 508 may compress one or more scan items into a compressed archive file. Additionally or alternatively, mobile device 508 may not convert one or more of the scan items as selected by user 502. Accordingly, mobile device 508 may save the conversion selections as conversion instructions. Mobile device 508 may send the scan items and the identity information to remote server 510. Where mobile device 508 does not convert the scan items as selected by user 502 but instead saves the conversion selections as conversion instructions, mobile device 508 may additionally send the conversion instructions to remote server 510. FIG. 7J depicts an illustrative GUI that may be presented upon the sending, from mobile device 508 to remote server 510, of scan items, identity information, and optionally, conversion instructions. As seen in FIG. 7J, user 502 mobile device 508 within mobile workspace/client agent 540, may display a message indicating that the scan is complete and that the scan items have been sent to virtual session 512. As described herein, further steps may be accomplished at remote server 510 and user device 504.

Figure 7K:
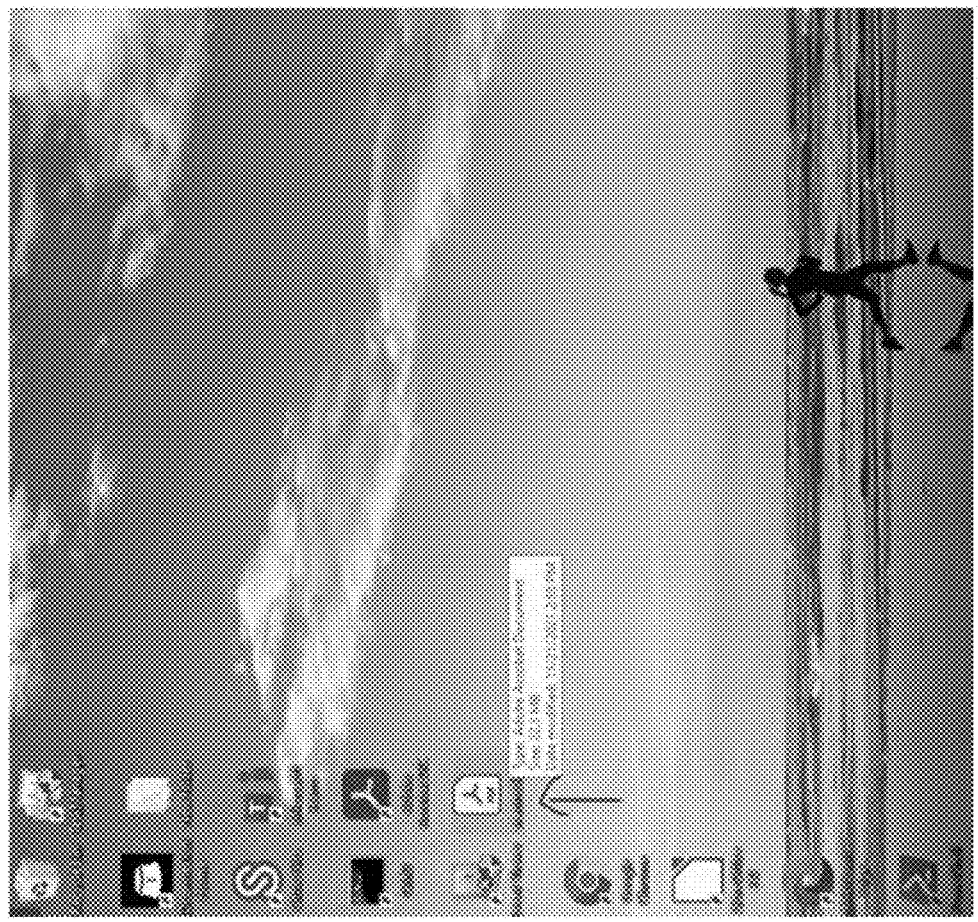
FIG. 7K depicts an illustrative GUI of an exemplary virtual desktop within virtual session with a scan placed therein according to one or more aspects described herein.

For example, as described in further detail with respect to FIGS. 6A-6C, remote server 510 may receive that which is sent by mobile device 508. According to aspects where mobile device 508 does not convert the scan items but saves the conversion selections as conversion instructions, remote server 510 may convert the scan items from a first file format to a second file format as selected by user 502. According to aspects wherein the identity information sent from mobile device 508 includes a unique scan session identifier, remote server 510 may retrieve additional identity information, as previously stored in a database, based on the unique scan session identifier. Based on the identity information, the remote server 510 may resolve the remote session 512, remote desktop 514, and user device 504 from which the scan session was initiated. Remote server 510 may place the scan in virtual session 512 being accessed by user 502. FIG. 7K illustrates an illustrative GUI of an exemplary virtual desktop 514 within virtual session 512 with scan placed therein.

Figure 8:
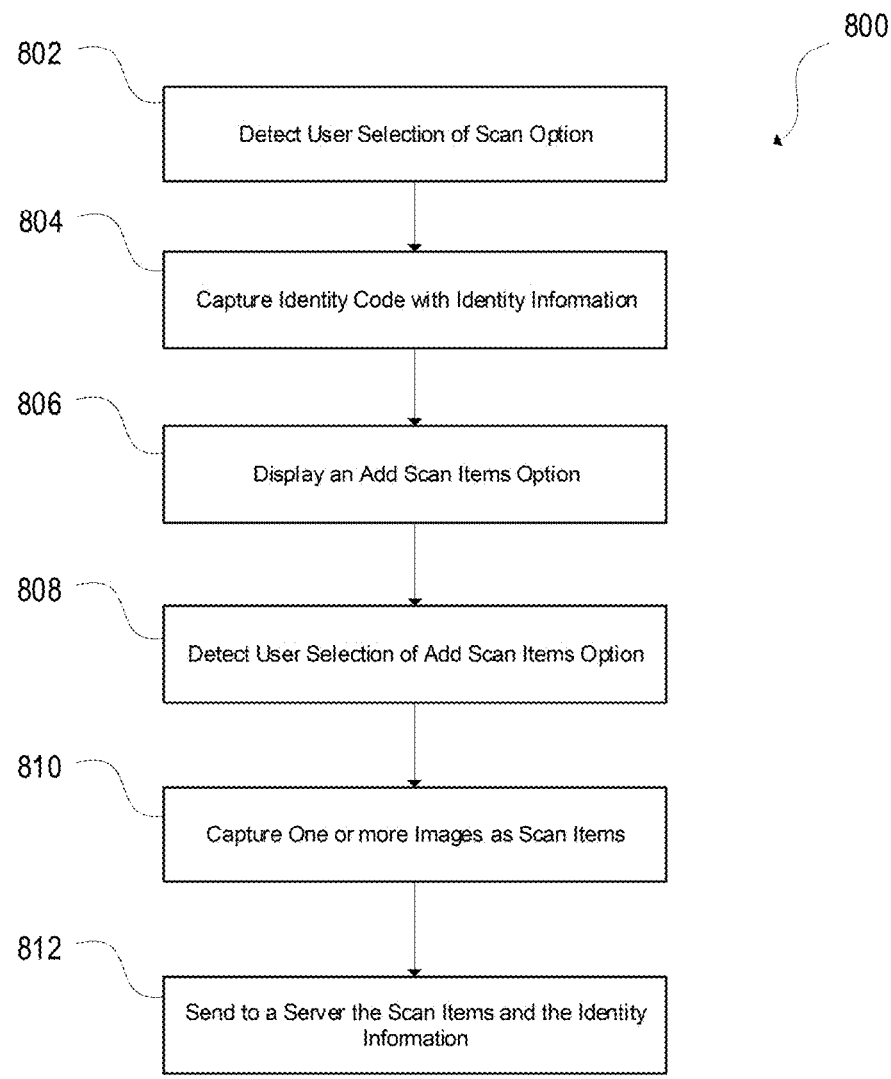
FIG. 8 depicts an illustrative flowchart for deploying and implementing scan functionality for virtual sessions according to one or more aspects described herein.

FIG. 8 depicts an illustrative flowchart (i.e., algorithm) for deploying and implementing scan functionality for virtual sessions. The illustrative algorithm of FIG. 8 may be performed using any device or component described in connection with FIGS. 1-5. Although one or more steps of FIG. 8 are described for convenience as being performed by mobile device (e.g., mobile device 508, mobile device 650), one, some, or all of such steps may be performed by, for example, client computers 411-414, client machine 240, device 107, 109, or one or more other computing devices, and steps may be distributed among one or more computing devices, including any computing devices such as those described in connection with FIGS. 1-5. One or more steps of FIG. 8 may be rearranged, modified, repeated, and/or omitted.

At step 802, the mobile device may detect a user selection of a scan option within a client agent (e.g., workspace/client agent 540). The client agent may be executing on the mobile device.

At step 804, the mobile device may capture, from a user device (e.g., user device 504, user device 652) accessing a virtual session (e.g., virtual session 512, virtual session 654), an identity code including identity information associated with the virtual session. According to aspects, and as described herein, the identity information may include at least a user device identifier and a virtual session identifier. Alternatively, according to aspects and as described herein, the identity information may include a unique scan session identifier (for example, a UUID that identifies the scan session) where the unique scan session identifier may be associated with at least a user device identifier and a virtual session identifier (as described more fully with respect to FIGS. 6A-6C). According to aspects and as described herein, the identity code may include a quick response (QR) code and the identity information may be embedded in the QR code. According to aspects and as described herein, the identity code (e.g., QR code) may be displayed on a display of the user device. According to aspects and as described herein, the capturing of the identity code may include capturing by a camera of the mobile device the QR code that is displayed on the user device. According to aspects and as described herein, the mobile device may further obtain the identity information from the identity code.

At step 806, in response to capturing the identity code, the mobile device may display an add scan items option for adding one or more scan items to a scan.

At step 808, the mobile device may detect a user selection of the add scan items option.

At step 810, the mobile device may capture, via a camera of the mobile device, one or more images as scan items. Capturing one or more images may include capturing one or more images of one or more documents. According to aspects and as described herein, the mobile device may further crop one or more of the one or more scan items of the one or more documents. According to aspects and as described herein, the mobile device may further save the one or more scan items as a first file format. The mobile device may further convert one or more of the one or more scan items to one or more second file formats.

At step 812, the mobile device may send to a server (e.g., remote server 510, remote server 656) associated with the virtual session, scan items and the identity information. According to aspects and as described herein, the mobile device may save one or more of the one or more scan items as a first file format. The mobile device may subsequently convert one or more of the one or more scan items from the first file format to a second file format. The mobile device may send to the server associated with the virtual session (e.g., remote server 510, remote server 656) the one or more converted scan items as the second file format along with the identity information. According to aspects and as described herein, the mobile device may save the one or more scan items as a first file format. The mobile device may send, to the server (e.g., remote server 510, remote server 656) associated with the virtual session the one or more scan items as the first file format, the identity information, and the instructions for converting one or more of the scan items to a second file format. The mobile device may further request of the server (e.g., remote server 510, remote server 656) a conversion of one or more of the one or more scan items to a second file format. According to aspects and as described herein, the captured one or more images (i.e., scan items) may define a scan. The mobile device may detect a user selection of an add local file option. The mobile device may attach one or more locally stored files to the scan as scan items. The mobile device may send to the server associated with the virtual session (e.g., remote server 510, remote server 656) the scan items and the identity information.

Figure 9:
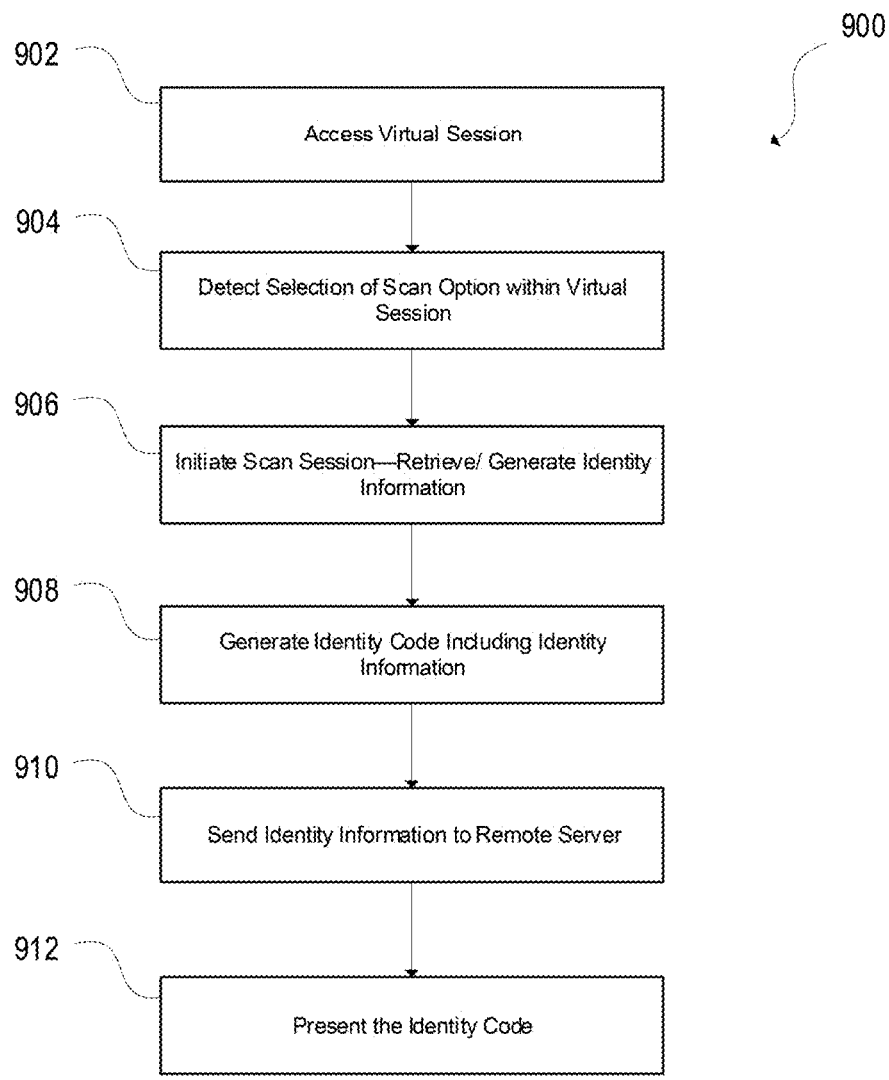
FIG. 9 depicts an illustrative flowchart for deploying and implementing scan functionality for virtual sessions according to one or more aspects described herein.

FIG. 9 depicts an illustrative flowchart (i.e., algorithm) for deploying and implementing scan functionality for virtual sessions. The illustrative algorithm of FIG. 9 may be performed using any device or component described in connection with FIGS. 1-5. Although one or more steps of FIG. 9 are described for convenience as being performed by a user device (for example user device 504, user device 652). One, some, or all of such steps may be performed by, for example, client computers 411-414, client machine 240, device 107, 109, or one or more other computing devices, and steps may be distributed among one or more computing devices, including any computing devices such as those described in connection with FIGS. 1-5. One or more steps of FIG. 9 may be rearranged, modified, repeated, and/or omitted.

At step 902, the user device may access a virtual session. For example, a virtual session (e.g., virtual session 512, virtual session 654) may be hosted and supported by a server (e.g., remote server 510, remote server 656, virtualization server 301). The user device may access the virtual session that is hosted and supported by the server (e.g., remote server 510). The virtual session accessed by the user device may include a virtual desktop (e.g., virtual desktop 514). The user device may access the virtual desktop running within the virtual session.

At step 904, the user device may detect a selection of a scan option within the virtual session. For example, a user (e.g., user 502, user 602) accessing the virtual session from the user device may select a scan option within the virtual session. The user device and/or the virtual session may detect the selection of the scan option.

At step 906, in response to the detection of the user selection of the scan option, the user device may initiate a scan session. The scan session may be initiated within the virtual session. As a part of initiating the scan session, the user device may retrieve and/or generate identity information. For example, user device may retrieve and/or generate identity information substantially as described with reference to step 606 of FIG. 6A.

At step 908, the user device may generate an identity code including identity information. For example, the user device may embed the identity information in the identity code such that the identity information may be obtained from the identity code. According to aspects, the identity code may take the form of a QR code with the identity information embedded therein. According to aspects, the identity information may include, but is not limited to, for example, a user identifier, a user name, a virtual session identifier, a user device identifier, a virtual desktop identifier, an authentication token, and/or a unique identity code identifier (identifying the identity code). Additionally or alternatively, identity information may further include a unique scan session identifier (e.g., a UUID that uniquely identifies the scan session). The unique scan session identifier may also be associated with some or all of the identity information described above. According to aspects, the identity information may be retrieved and/or generated by the virtual session being accessed by the user device.

At step 910, the user device may send the identity information to remote server 510. For example, according to aspects including a unique scan session identifier, the unique scan session identifier may be embedded in the identity code and may be associated with one or more further identity information (e.g., user identifier, a user name, a virtual session identifier, a user device identifier, a virtual desktop identifier, an authentication token, or a unique identity code identifier, etc.) that is not embedded in the identity code. According to such aspects, the user device may send at least some of the above identity information (e.g., virtual desktop identifier, user device identifier etc.) to a remote server (e.g., remote server 510, remote server 656) along with the unique scan session identifier. The remote server may store the received identity information in a database. The stored identity information may be later retrieved based on the unique scan session identifier.

At step 912, the user device may present the identity code. The user device may present the identity code such that the identity code may be captured by an I/O sensor of another device (e.g., mobile device 508). For example, according to aspects where the identity code takes the form of a QR code, the user device may display, on a display of the user device, the QR code with the embedded identity information. According to aspects, and as described above, the identity code, or portions thereof, may take various forms and may be presented variously.

Figure 10:
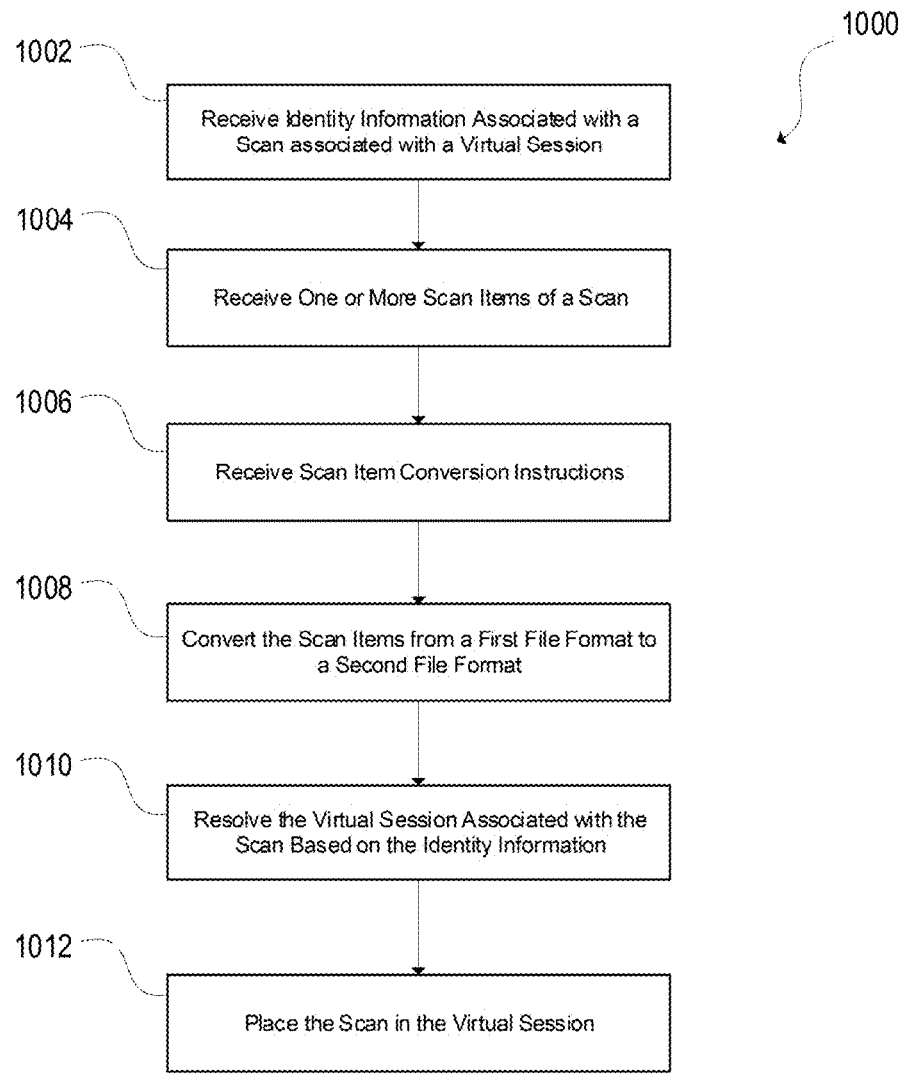
FIG. 10 depicts an illustrative flowchart for deploying and implementing scan functionality for virtual sessions according to one or more aspects described herein.

FIG. 10 depicts an illustrative flowchart (i.e., algorithm) for deploying and implementing scan functionality for virtual sessions. The illustrative algorithm of FIG. 10 may be performed using any device or component described in connection with FIGS. 1-5. Although one or more steps of FIG. 10 are described for convenience as being performed by a remote server (e.g., remote server 510, remote server 656). One, some, or all of such steps may be performed by, for example, computing device 201, virtualization server 301, management server 410, or one or more other computing devices, and steps may be distributed among one or more computing devices, including any computing devices such as those described in connection with FIGS. 1-5. One or more steps of FIG. 10 may be rearranged, modified, repeated, and/or omitted.

At step 1002, the remote server may receive identity information associated with a scan and/or scan session that is associated with a virtual session (e.g., virtual session 512, virtual session 654). For example, the identity information may be associated with a scan. The scan may be associated with a scan session that was initiated from the virtual session. The identity information may be received from, for example, a user device (e.g., user device 504, user device 652), or a mobile device (e.g., mobile device 508, mobile device 650). Alternatively, some identity information may be received from the user device and some identity information may be received from the mobile device and substantially the same time or at a later or earlier time. For example, the remote server may receive some identity information including, for example, a unique scan session identifier, a user device identifier, and a virtual session identifier. Later, the remote server may receive from the mobile device the same unique scan session identifier. Further, according to aspects, the remote server may retrieve from a storage database at the remote server, the identity information that was previously received (e.g., from the user device), using the identity information (e.g., unique scan session identifier) that was subsequently received (e.g., from the mobile device).

At step 1004, the remote server may receive one or more scan items of a scan. For example, one or more images may have been captured by the mobile device and added as scan items to the scan. Additionally or alternatively, one or more scan items (e.g., images and/or files) may have been added from local mobile device storage or from storage available to the mobile device via a network connection. The remote server may receive the one or more scan items from the mobile device.

At step 1006, the remote server may receive scan item conversion instructions. For example, a user (e.g., user 502, user 602) may select scan item conversions (for example, from a first file format to a second file format) on the mobile device as described in more detail herein. The mobile device may save the scan item conversion selections as scan item conversion instructions. The mobile device may send the scan item conversion instruction to the remote server. The remote server may subsequently receive the scan item conversion instructions.

At step 1008, the remote server may convert one or more of the scan items from a first file format to a second file format substantially as described with reference to step 632 of FIG. 6B and step 642 of FIG. 6C. The remote server may convert one or more of the scan items based on the received scan item conversion instructions.

At step 1010, the remote server may resolve the virtual session associated with the scan based on the received identity information. Resolving the virtual session may include resolving a virtual desktop (e.g., virtual desktop 514) running in the virtual session. Resolving the virtual session may further include resolving the user device from which the scan session was initiated. For example, the remote server may identify, based on one or more of the identity information received, the virtual session that is accessed by the user device and from which the scan session originated. According to other aspects, as described, the remote server may retrieve further identity information that was stored in a storage database at the remote server based on identity information retrieved. According to such aspects, the remote server may utilize the retrieved identity information to resolve the virtual session associated with the scan.

At step 1012, the remote server may place the scan in the resolved virtual session. Placing the scan in the resolved virtual session may include placing the scan in the resolved virtual desktop. For example, the remote server may be the same server that hosts and supports the virtual session. According to such aspects, after resolution, the remote server may place the scan in the virtual session. According to other aspects, the remote server may not be the server that hosts and supports the virtual session but may be in working communication with the server that hosts and supports the virtual session. According to such aspects, the remote server may send the scan to the sever that hosts and supports the virtual session with instructions to place the scan in the resolved virtual session that is associated with the scan.

The following paragraphs (M1) through (M8) describe examples of methods that may be implemented in accordance with the present disclosure.

(M1) A method comprising: detecting, detecting, by a mobile device, a user selection of a scan option within a client agent; capturing, by the mobile device and from a user device accessing a virtual session, an identity code comprising identity information associated with the virtual session; in response to capturing the identity code, displaying, by the mobile device, an add scan items option for adding one or more scan items to a scan; detecting, by the mobile device, a user selection of the add scan items option; capturing, by a camera of the mobile device, one or more images as scan items; and sending, to a server associated with the virtual session, the scan items and the identity information.

(M2) A method may be performed as described in paragraph (M1), further comprising: saving one or more of the scan items as a first file format; and converting, by the mobile device, one or more of the one or more scan items from the first file format, to a second file format.

(M3) A method may be performed as described in paragraph (M1) or (M2), further comprising: saving one or more of the scan items as a first file format; and sending, to the server associated with the virtual session: the one or more scan items as the first file format; the identity information; and instructions for converting one or more of the scan items to a second file format.

(M4) A method may be performed as described in any one of paragraphs (M1)-(M3), wherein the identity information comprises at least a unique scan session identifier, wherein the unique scan session identifier is associated with at least a user device identifier and a virtual session identifier.

(M5) A method may be performed as described in any one of paragraphs (M1)-(M4), wherein the identity code comprises a quick response (QR) code, wherein the identity information is embedded in the quick response (QR) code.

(M6) A method may be performed as described in paragraph (M5), wherein the capturing of the identity code comprises: capturing, by the camera of the mobile device, the quick response (QR) code displayed on the user device.

(M7) A method may be performed as described in any one of paragraphs (M1)-(M6), further comprising: obtaining, by the mobile device and from the identity code, the identity information.

(M8) A method may be performed as described in any of paragraphs (M1)-(M3), further comprising: detecting, by the mobile device, a user selection of an add local file option; attaching one or more local files as scan items to the scan; and sending, to the server associated with the virtual session, the scan items and the identity information.

The following paragraphs (S1) through (S8) describe examples of systems that may be implemented in accordance with the present disclosure.

(S1) A system comprising: a user device comprising: a user device display, wherein the user device is configured to: access a virtual session; and display, on the user device display, an identity code comprising identity information; a server associated with the virtual session; and a mobile device comprising: a camera, wherein the mobile device is configured to: detect a user selection of a scan option within a client agent; capture, with the camera, the identity code displayed on the user device display; in response to capturing the identity code, display an add scan items option for adding one or more scan items to a scan; detect a user selection of the add scan items option; capture, with the camera, one or more images as scan items; and send, to the server associated with the virtual session, the scan items and the identity information; wherein the server associated with the virtual session is configured to: receive the scan items and the identity information; resolve the virtual session based on the identity information; and place the scan items into the virtual session.

(S2) The system described in paragraph (S1), wherein the mobile device is further configured to: save one or more of the scan items as a first file format; convert one or more of the one or more saved scan items to a second file format; and send, to the server associated with the virtual session, the scan items, and the identity information.

(S3) The system described in any one of paragraphs (S1) or (S2), wherein the mobile device is further configured to: save one or more of the scan items as a first file format; send, to the server associated with the virtual session: the scan items as a first file format; the identity information; and instructions for converting one or more of the scan items from the first file format to a second file format; and wherein the server associated with the virtual session is further configured to: convert one or more of the scan items to the second file format.

(S4) The system described in any one of paragraphs (S1)-(S3), wherein the identity information comprises at least a unique scan session identifier, wherein the unique scan session identifier is associated with at least a user device identifier and a virtual session identifier.

(S5) The system described in any one of paragraphs (S1)-(S4), wherein the identity code comprises a quick response (QR) code, wherein the identity information is embedded in the quick response (QR) code.

(S6) The system described in paragraph (S5), wherein the displaying an identity code comprises: displaying, on the user device display, the quick response (QR) code, and wherein the capturing of the identity code comprises: capturing, by the camera, the quick response (QR) code displayed on the user device display.

(S7) The system described in any one of paragraphs (S1)-(S6), wherein the mobile device is further configured to: detect a user selection of an add local file option; add one or more local files as scan items to the scan; and send, to the server associated with the virtual session, the scan and the identity information.

(S8) A system comprising: a computing device configured to perform the method of any one of paragraphs (M1)-(M8).

The following paragraphs (A1) through (A6) describe examples of apparatuses that may be implemented in accordance with the present disclosure.

(A1) An apparatus comprising one or more processors; and memory storing instructions that when executed by the one or more processors, cause the apparatus to: detect a user selection of a scan option within a client agent executing on the apparatus; capture, from a user device accessing a virtual session, an identity code comprising identity information associated with the virtual session; in response to capturing the identity code, display an add scan items option for adding one or more scan items to a scan; detect a user selection of the add scan items option; capture, by a camera of the apparatus, one or more images as scan items; and send, to a server associated with the virtual session, the scan items and the identity information.

(A2) The apparatus described in paragraph (A1), wherein the instructions, when executed by the one or more processors, further cause the apparatus to: save one or more of the scan items as a first file format; and convert, one or more of the one or more scan items as a first file format, to a second file format.

(A3) The apparatus described in paragraph (A1) or (A2), wherein the instructions, when executed by the one or more processors, further cause the apparatus to: save one or more of the scan items as a first file format; send, to the server associated with the virtual session: the one or more scan items as the first file format; the identity information; and instructions for converting one or more of the scan items to a second file format.

(A4) The apparatus described in any one of paragraphs (A1)-(A3), wherein the instructions, when executed by the one or more processors, further cause the apparatus to: obtain the identity information from the identity code.

(A5) The apparatus described in any one of paragraphs (A1)-(A4), wherein the instructions, when executed by the one or more processors further cause the apparatus to: detect a user selection of an add local file option; attach one or more local files as scan items to the scan; and send, to the server associated with the virtual session, the scan items and the identity information.

(A6) An apparatus comprising: one or more processors; and memory storing instructions that, when executed by the one or more processors, cause the apparatus to perform the method of any one of paragraphs (M1)-(M8).

The following paragraph (CRM1) describes examples of computer-readable media that may be implemented in accordance with the present disclosure.

(CRM1) One or more non-transitory computer-readable media storing instructions that, when executed by one or more processors of a computing device, cause the computing device to perform the method of any one of paragraphs (M1)-(M8).

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    detecting, by a mobile device, a user selection of a scan option within a client agent;
    capturing, by the mobile device and from a user device accessing a virtual session, an identity code comprising identity information associated with the virtual session;
    in response to capturing the identity code, displaying, by the mobile device, an add scan items option for adding one or more scan items to a scan;
    detecting, by the mobile device, a user selection of the add scan items option;
    capturing, by a camera of the mobile device, one or more images as scan items; and
    sending, to a server associated with the virtual session, the scan items and the identity information.

2. The method of claim 1, further comprising:
    saving one or more of the scan items as a first file format; and
    converting, by the mobile device, one or more of the one or more scan items from the first file format, to a second file format.

3. The method of claim 1, further comprising:
    saving one or more of the scan items as a first file format;
    sending, to the server associated with the virtual session:
        the one or more scan items as the first file format;
        the identity information; and
        instructions for converting one or more of the scan items to a second file format.

4. The method of claim 1, wherein the identity information comprises at least a unique scan session identifier, wherein the unique scan session identifier is associated with at least a user device identifier and a virtual session identifier.

5. The method of claim 1, wherein the identity code comprises a quick response (QR) code, wherein the identity information is embedded in the quick response (QR) code.

6. The method of claim 5, wherein the capturing of the identity code comprises:
capturing, by the camera of the mobile device, the quick response (QR) code displayed on the user device.

7. The method of claim 1, further comprising:
obtaining, by the mobile device and from the identity code, the identity information.

8. The method of claim 1, further comprising:
detecting, by the mobile device, a user selection of an add local file option; attaching one or more local files as scan items to the scan; and
sending, to the server associated with the virtual session, the scan items and the identity information.

9. A system comprising:
a user device comprising:
a user device display,
wherein the user device is configured to:
access a virtual session; and
display, on the user device display, an identity code comprising identity information;
a server associated with the virtual session; and
a mobile device comprising:
a camera,
wherein the mobile device is configured to:
detect a user selection of a scan option within a client agent;
capture, with the camera, the identity code displayed on the user device display;
in response to capturing the identity code, display an add scan items option for adding one or more scan items to a scan;
detect a user selection of the add scan items option;
capture, with the camera, one or more images as scan items; and
send, to the server associated with the virtual session, the scan items and the identity information;
wherein the server associated with the virtual session is configured to:
receive the scan items and the identity information;
resolve the virtual session based on the identity information; and
place the scan items into the virtual session.

10. The system of claim 9, wherein the mobile device is further configured to:
save one or more of the scan items as a first file format;
convert one or more of the one or more saved scan items to a second file format; and
send, to the server associated with the virtual session, the scan items, and the identity information.

11. The system of claim 9, wherein the mobile device is further configured to:
save one or more of the scan items as a first file format;
send, to the server associated with the virtual session:
the scan items as a first file format;
the identity information; and
instructions for converting one or more of the scan items from the first file format to a second file format; and
wherein the server associated with the virtual session is further configured to: convert one or more of the scan items to the second file format.

12. The system of claim 9, wherein the identity information comprises at least a unique scan session identifier, wherein the unique scan session identifier is associated with at least a user device identifier and a virtual session identifier.

13. The system of claim 9, wherein the identity code comprises a quick response (QR) code, wherein the identity information is embedded in the quick response (QR) code.

14. The system of claim 13, wherein the displaying an identity code comprises:
displaying, on the user device display, the quick response (QR) code, and wherein the capturing of the identity code comprises:
capturing, by the camera, the quick response (QR) code displayed on the user device display.

15. The system of claim 9, wherein the mobile device is further configured to:
detect a user selection of an add local file option;
add one or more local files as scan items to the scan; and
send, to the server associated with the virtual session, the scan and the identity information.

16. An apparatus comprising:
one or more processors; and
memory storing instructions that when executed by the one or more processors, cause the apparatus to:
detect a user selection of a scan option within a client agent executing on the apparatus;
capture, from a user device accessing a virtual session, an identity code comprising identity information associated with the virtual session;
in response to capturing the identity code, display an add scan items option for adding one or more scan items to a scan;
detect a user selection of the add scan items option;
capture, by a camera of the apparatus, one or more images as scan items; and
send, to a server associated with the virtual session, the scan items and the identity information.

17. The apparatus of claim 16, wherein the instructions, when executed by the one or more processors, further cause the apparatus to:
save one or more of the scan items as a first file format; and
convert, one or more of the one or more scan items as a first file format, to a second file format.

18. The apparatus of claim 16, wherein the instructions, when executed by the one or more processors, further cause the apparatus to:
save one or more of the scan items as a first file format;
send, to the server associated with the virtual session:
the one or more scan items as the first file format;
the identity information; and
instructions for converting one or more of the scan items to a second file format.

19. The apparatus of claim 16, wherein the instructions, when executed by the one or more processors, further cause the apparatus to:
obtain the identity information from the identity code.

20. The apparatus of claim 16, wherein the instructions, when executed by the one or more processors further cause the apparatus to:

detect a user selection of an add local file option;
attach one or more local files as scan items to the scan; and
send, to the server associated with the virtual session, the scan items and the identity information.

\* \* \* \* \*